United States Patent
Lee et al.

(10) Patent No.: US 9,516,656 B2
(45) Date of Patent: Dec. 6, 2016

(54) METHOD AND APPARATUS FOR ALLOCATING RESOURCES BY A FEMTOCELL BASE STATION TO A TERMINAL CONNECTED THERETO

(75) Inventors: Wookbong Lee, Anyang-si (KR); Inuk Jung, Anyang-si (KR); Jinsam Kwak, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 14/114,100

(22) PCT Filed: Apr. 27, 2012

(86) PCT No.: PCT/KR2012/003299
§ 371 (c)(1),
(2), (4) Date: Oct. 25, 2013

(87) PCT Pub. No.: WO2012/148221
PCT Pub. Date: Nov. 1, 2012

(65) Prior Publication Data
US 2015/0004987 A1 Jan. 1, 2015

Related U.S. Application Data

(60) Provisional application No. 61/479,831, filed on Apr. 27, 2011, provisional application No. 61/491,312, filed on May 30, 2011.

(51) Int. Cl.
*H04W 84/04* (2009.01)
*H04W 16/32* (2009.01)
(Continued)

(52) U.S. Cl.
CPC ............ *H04W 72/08* (2013.01); *H04W 16/10* (2013.01); *H04W 16/32* (2013.01); *H04W 28/048* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2003/0087603 A1* | 5/2003 | Li | H04J 13/18 455/63.1 |
| 2007/0270151 A1 | 11/2007 | Claussen et al. | |

(Continued)

FOREIGN PATENT DOCUMENTS

| | | |
|---|---|---|
| KR | 10-2010-0048875 A | 5/2010 |
| KR | 10-2010-0066898 A | 6/2010 |

(Continued)

*Primary Examiner* — King Poon
*Assistant Examiner* — Vincent Peren
(74) *Attorney, Agent, or Firm* — Birch, Stewart, Kolasch & Birch, LLP

(57) ABSTRACT

The present invention relates to a wireless communication system, and more particularly, to method and apparatus for transmitting information. According to one aspect of the present invention, a method for allocating resources by a femtocell base station (BS) to a first terminal connected to said femto-cell BS, comprising the steps of: receiving information, which is transmitted by a macro base station (BS) to a second terminal connected to said macro BS; calculating a distance between said second terminal and said femtocell BS using first information for allocating resources to said second terminal from among said received information; and transmitting, to said first terminal, a resource allocation signal for allocating resources to said first terminal, when the calculated distance is equal to or greater than a predefined threshold distance.

14 Claims, 24 Drawing Sheets

(51) Int. Cl.
*H04W 72/08* (2009.01)
*H04W 16/10* (2009.01)
*H04W 28/04* (2009.01)

(56) References Cited

U.S. PATENT DOCUMENTS

| | | |
|---|---|---|
| 2010/0111022 A1 | 5/2010 | Chang et al. |
| 2010/0144338 A1 | 6/2010 | Kim et al. |
| 2010/0197338 A1* | 8/2010 | Bonneville ......... H04W 52/244 455/522 |
| 2011/0223923 A1* | 9/2011 | Cho .................... H04W 72/082 455/448 |
| 2012/0142364 A1* | 6/2012 | Duan ................. H04W 72/082 455/450 |

FOREIGN PATENT DOCUMENTS

| | | | | |
|---|---|---|---|---|
| KR | 10-2010-0131620 A | | 12/2010 | |
| WO | WO 2011/021387 | * | 2/2011 | .......... H04W 52/244 |

\* cited by examiner

FIG. 7
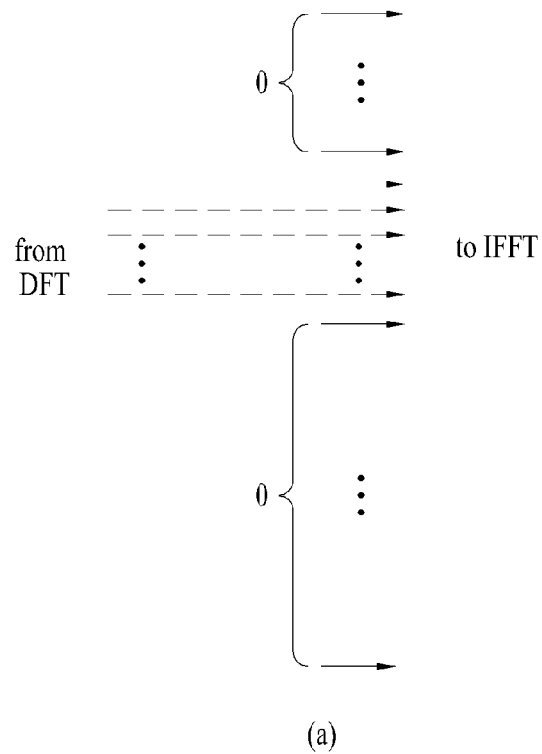
(a)
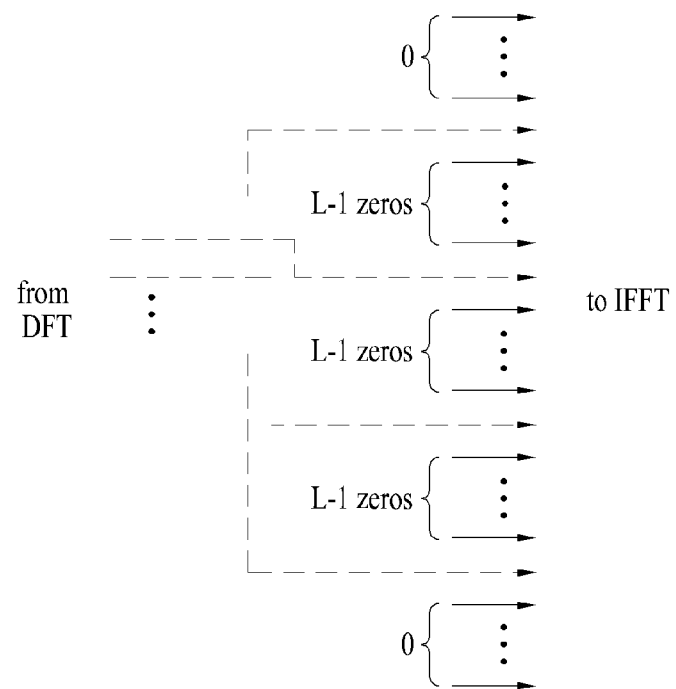
(b)

$$y_M = \sqrt{g_{M,M}} \sqrt{P_M} h_{M,M} w_M x_M + \sum_{n=1}^{N} \sqrt{g_{n,M}} \sqrt{P_n} h_{n,M} w_n x_n + n_M$$

$$= \sqrt{g_{M,M}} \sqrt{P_M} h_{M,M} w_M x_M + \sqrt{g_{i,M}} \sqrt{P_i} h_{i,M} w_i x_i + \tilde{n}_M$$

$$y_i = \sqrt{g_{M,i}} \sqrt{P_M} h_{M,i} w_M x_M + \sqrt{g_{i,i}} \sqrt{P_i} h_{i,i} w_i x_i + \tilde{n}_i$$

FIG. 23
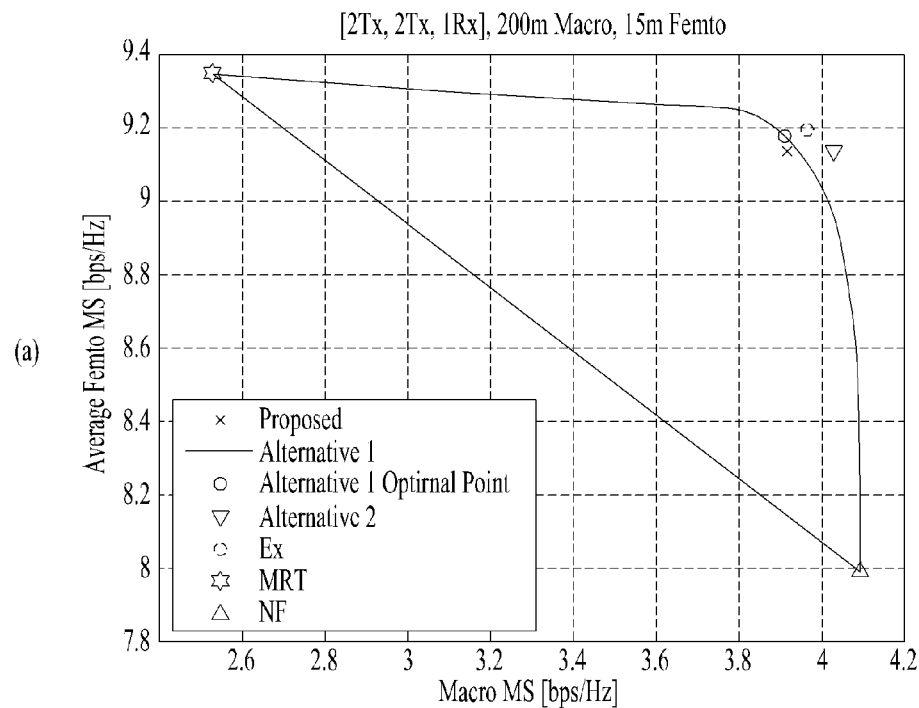
(a)
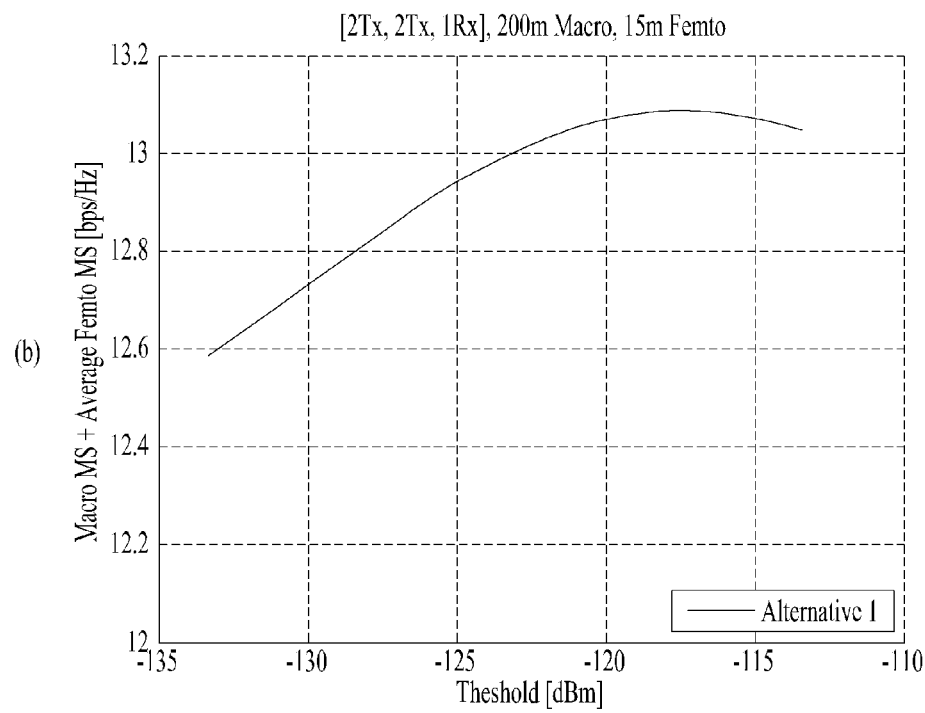
(b)

FIG. 25
(a)
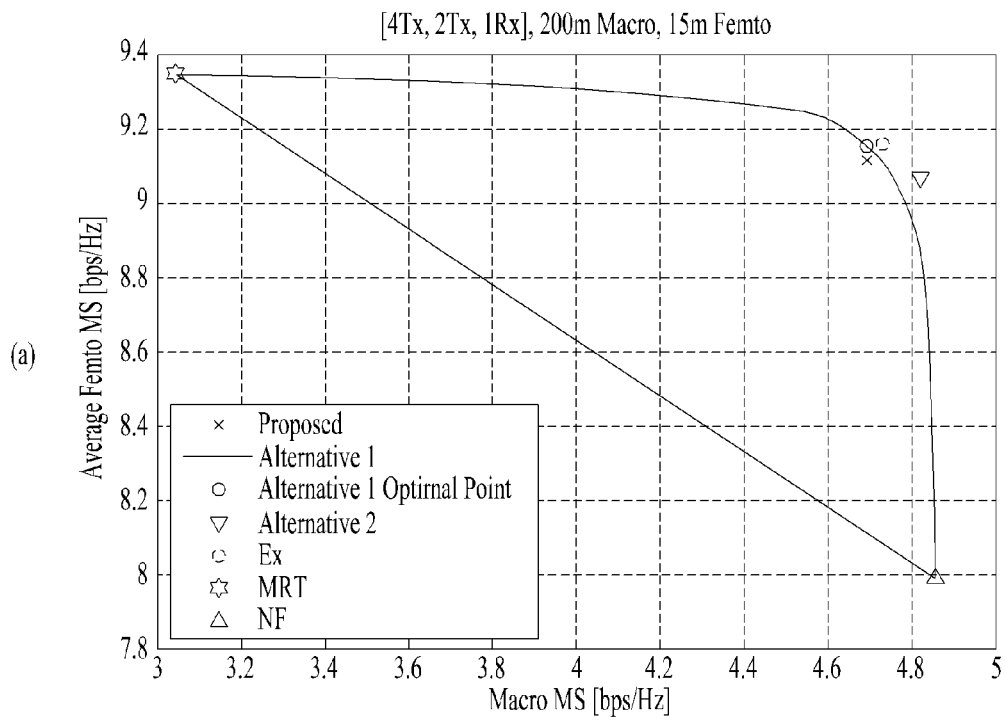
(b)
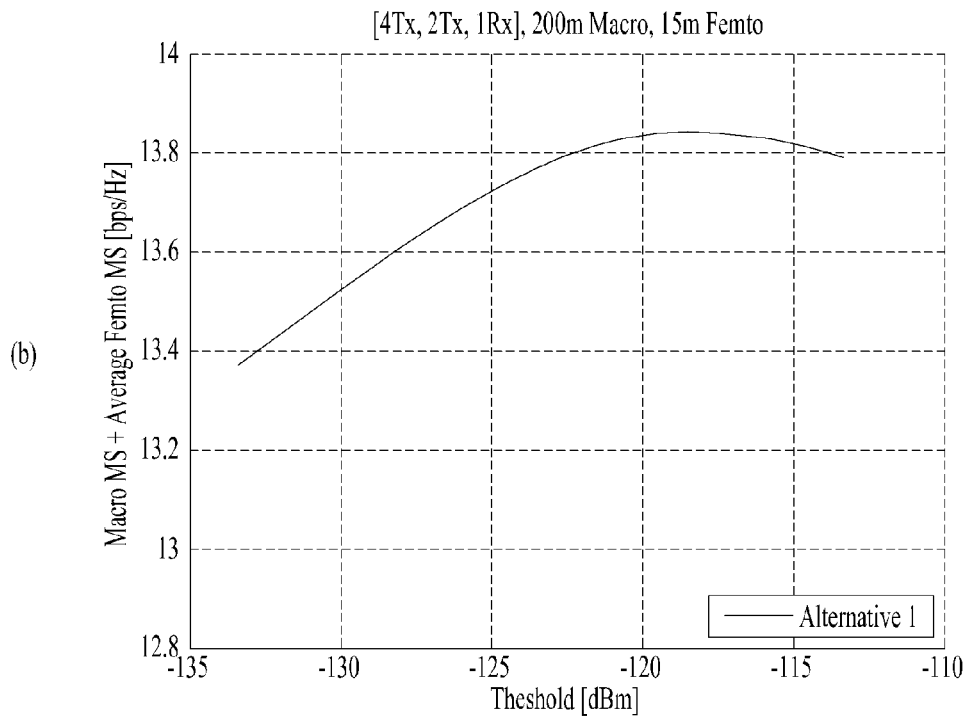

FIG. 27
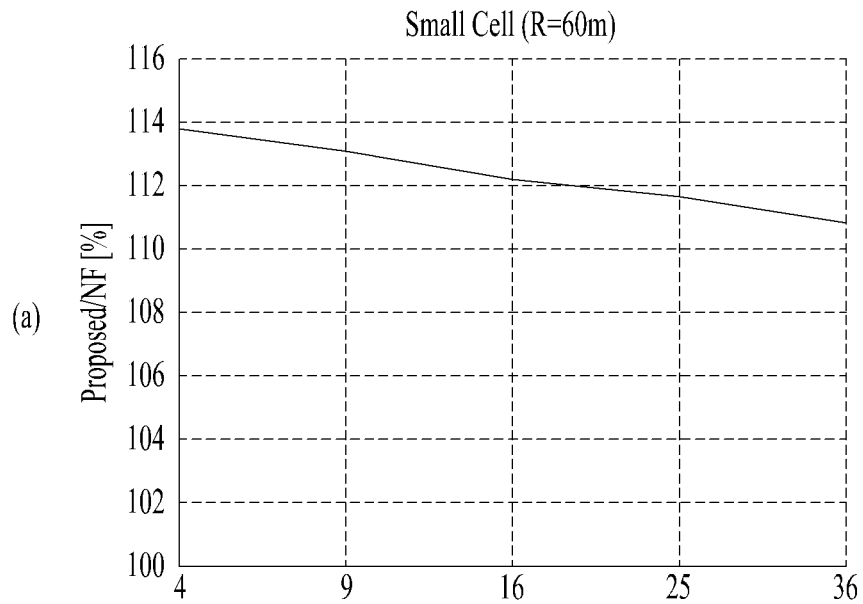
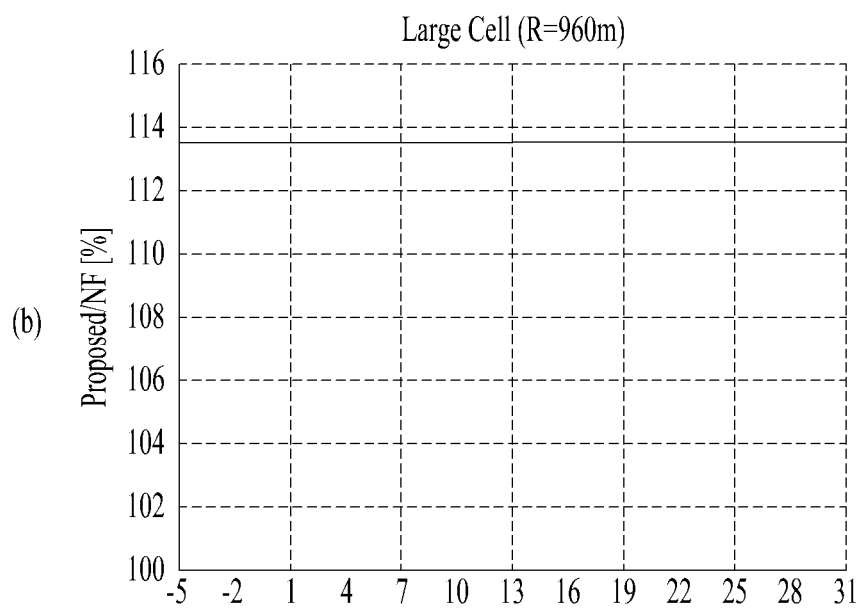

METHOD AND APPARATUS FOR ALLOCATING RESOURCES BY A FEMTOCELL BASE STATION TO A TERMINAL CONNECTED THERETO

CROSS REFERENCE TO RELATED APPLICATIONS

This application is the National Phase of PCT/KR2012/003299 filed on Apr. 27, 2012, which claims priority under 35 U.S.C. §119(e) to U.S. Provisional Application No. 61/479,831 filed on Apr. 27, 2011, and under 35 U.S.C. §119(e) to U.S. Provisional Application No. 61/491,312 filed on May 30, 2011, all of which are hereby expressly incorporated by reference into the present application.

BACKGROUND OF THE INVENTION

Field of the Invention

The present invention relates to a wireless communication system and, more specifically, to a method and device for transmitting information.

Discussion of the Related Art

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. Examples of the multiple access system include CDMA (code division multiple access), FDMA (frequency division multiple access), TDMA (time division multiple access), OFDMA (orthogonal frequency division multiple access), SC-FDMA (single carrier frequency division multiple access), etc.

SUMMARY OF THE INVENTION

An object of the present invention devised to solve the problem lies in a method for efficiently transmitting control information in a wireless communication system and a device for the same. Another object of the present invention is to provide a channel format, a signal processing method and a device for the same to efficiently transmit control information. Another object of the present invention is to provide a method for efficiently allocating resources for transmitting control information and a device for the same.

The technical problems solved by the present invention are not limited to the above technical problems and those skilled in the art may understand other technical problems from the following description.

The object of the present invention can be achieved by providing a method for allocating resources by a femtocell base station (BS) to a first terminal connected thereto, including: receiving information transmitted by a macro base station (BS) to a second terminal connected to the macro BS; calculating a distance between the second terminal and the femtocell BS using first information for allocating resources to the second terminal from among the received information; and transmitting, to the first terminal, a resource allocation signal for allocating resources to the first terminal, when the calculated distance is equal to or greater than a predefined threshold distance.

In another aspect of the present invention, provided herein is a method through which a first terminal connected to a femto BS is allocated resources from the femto BS, the method including: receiving information transmitted by a macro BS to a second terminal connected to the macro BS; calculating a distance between the second terminal and the first terminal using first information for allocating resources to the second terminal from among the received information; and receiving, from the femto BS, a resource allocation signal for allocating resources to the first terminal, when the calculated distance is equal to or greater than a predefined threshold distance.

In another aspect of the present invention, provided herein is a method for allocating resources by a femtocell BS to a first terminal connected thereto, the method including: receiving information transmitted by a macro BS to a second terminal connected to the macro BS; calculating long term statistics of first information for allocating resources to the second terminal from among the received information; calculating a distance between the second terminal and the femto BS using the long term statistics; and transmitting, to the first terminal, a resource allocation signal for allocating resources to the first terminal, when the calculated distance is equal to or greater than a predefined threshold distance.

In another aspect of the present invention, provided herein is a method through which a first terminal connected to a femto BS is allocated resources from the femto BS, the method including: receiving information transmitted by a macro BS to a second terminal connected to the macro BS; calculating long term statistics of first information for allocating resources to the second terminal from among the received information; calculating a distance between the second terminal and the first terminal using the long term statistics; and receiving, from the femto BS, a resource allocation signal for allocating resources to the first terminal, when the calculated distance is equal to or greater than a predefined threshold distance.

In another aspect of the present invention, provided herein is a femto BS for allocating resources to a first terminal, including: a reception module for receiving information transmitted by a macro BS to a second terminal connected to the macro BS; a processor for calculating a distance between the second terminal and the femtocell BS using first information for allocating resources to the second terminal from among the received information; and a transmission module for transmitting, to the first terminal, a resource allocation signal for allocating resources to the first terminal, when the calculated distance is equal to or greater than a predefined threshold distance.

In another aspect of the present invention, provided herein is a first terminal allocated resources from a femto BS, including: a reception module for receiving information transmitted by a macro BS to a second terminal connected to the macro BS; and a processor for calculating a distance between the second terminal and the first terminal using first information for allocating resources to the second terminal from among the received information, wherein the reception module receives, from the femto BS, a resource allocation signal for allocating resources to the first terminal under the control of the processor, when the calculated distance is equal to or greater than a predefined threshold distance.

In another aspect of the present invention, provided herein is a femto BS for allocating resources to a first terminal, including: a reception module for receiving information transmitted by a macro BS to a second terminal connected to the macro BS; a processor for calculating long term statistics of first information for allocating resources to the second terminal from among the received information and calculating a distance between the second terminal and the femto BS using the long term statistics; and a transmission module for transmitting, to the first terminal, a resource allocation signal for allocating resources to the first terminal, when the calculated distance is equal to or greater than a predefined threshold distance.

In another aspect of the present invention, provided herein is a first terminal provided with resources from a femto BS, including: a reception module for receiving information transmitted by a macro BS to a second terminal connected to the macro BS; and a processor for calculating long term statistics of first information for allocating resources to the second terminal from among the received information and calculating a distance between the second terminal and the first terminal using the long term statistics, wherein the reception module receives, from the femto BS, a resource allocation signal for allocating resources to the first terminal under the control of the processor, when the calculated distance is equal to or greater than a predefined threshold distance.

According to the present invention, control information can be efficiently transmitted in a wireless communication system. In addition, a channel format and a signal processing method for efficiently transmitting control information are provided. Furthermore, resources for control information transmission can be efficiently allocated.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 7 illustrates examples of mapping input symbols to subcarriers in the frequency domain while satisfying signal carrier properties;

FIGS. 23(a) and 23(b) illustrate result values of the present invention in a CSG case to which 2Tx, 2Tx and 1Rx are applied;

FIGS. 25(a) and 25(b) illustrate result values of the present invention in a CSG case to which 4Tx, 2Tx and 1Rx are applied;

FIGS. 27(a) and 27(b) illustrate impact of the number of femto BSs.

DETAILED DESCRIPTION OF THE INVENTION

Figure 1:
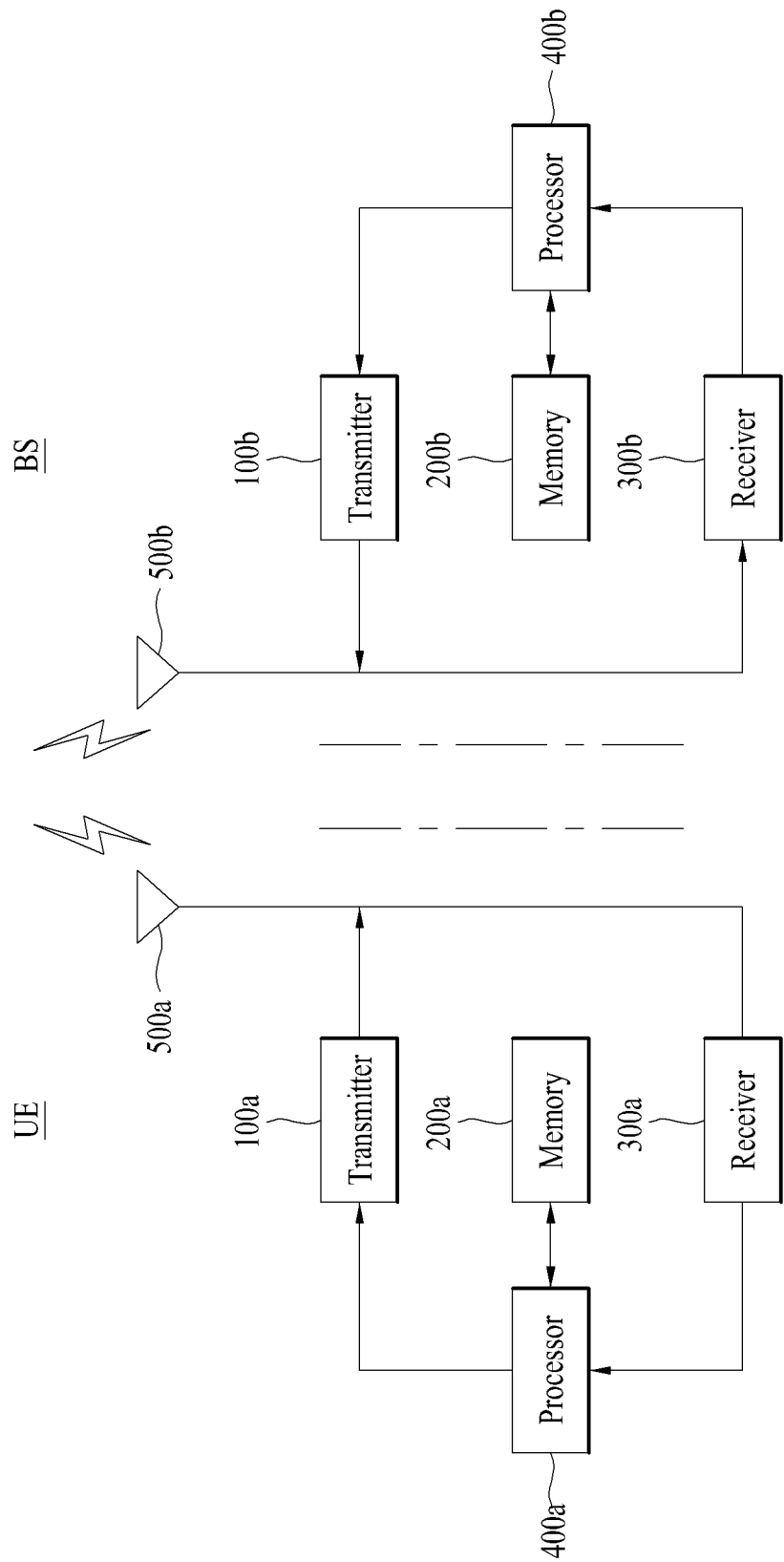
FIG. 1 illustrates configurations of a user equipment (UE) and a base station (BS) to which the present invention is applied.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Techniques, apparatuses and systems, which will be described below, are applicable to a variety of wireless access systems such as CDMA (code division multiple access), FDMA (frequency division multiple access), TDMA (time division multiple access), OFDMA (orthogonal frequency division multiple access), SC-FDMA (single carrier frequency division multiple access), etc. CDMA can be implemented as a radio technology such as UTRA (universal terrestrial radio access) or CDMA2000. TDMA can be implemented as a radio technology such as GSM (global system for mobile communications)/GPRS (general packet radio service)/EDGE (enhanced data rates for GSM evolution). OFDMA can be implemented as a radio technology such as IEEE 802.11 (Wireless Fidelity (Wi-Fi)), IEEE 802.16 (Worldwide interoperability for Microwave Access (WiMAX)), IEEE 802-20, Evolved UTRA (E-UTRA), etc. UTRAN is a part of UMTS (universal mobile telecommunications system). 3GPP LTE is a part of E-UMTS (evolved UMTS) using E-UTRA, employing OFDMA for downlink and SC-FDMA for uplink. 3GPP LTE adopts OFDMA on downlink and adopts SC-FDMA on uplink. LTE-A is an evolution of 3GPP LTE. For clarity, the following description focuses on 3GPP LTE/3GPP LTE-A. However, technical features of the present invention are not limited thereto. For example, although the following description is based on a wireless communication system corresponding to 3GPP LTE/LTE-A, the present invention is applicable to other wireless communication systems except for unique characteristics of 3GPP LTE/LTE-A.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) is fixed or mobile. The UE is a device that transmits and receives user data and/or control information by communicating with a base station (BS). The term 'UE'may be replaced with 'terminal equipment', 'MA (mobile station)', 'MT (mobile terminal)', 'UT (user terminal)', 'SS (subscriber station)', 'wireless device', 'PDA (personal digital assistant)', 'wireless modem', 'handheld device', etc.

A BS is typically a fixed station that communicates with a UE and/or another BS. The BS exchanges data and control information with a UE and another BS. The term 'BS' may be replaced with 'eNB (evolved-Node B)'volBTS (base transceiver system)iveraccess points ietc.

In the present invention, allocation of a specific signal to a frame/subframe/slot/carrier/subcarrier refers to transmission of the specific signal through the corresponding carrier/subcarrier for the duration or at the timing of the corresponding frame/subframe/slot.

In the present invention, a rank or a transport rank refers to the number of layers multiplexed or allocated to a single OFDM symbol or a single resource element.

In the present invention, PDCCH (physical downlink control channel)/PCFICH (physical control format indicator channel)/PHICH (physical hybrid automatic retransmit request indicator channel)/PDSCH (physical downlink shared channel) respectively refer to sets of resource elements carrying DCI (downlink control information)/CFI (control format indicator)/ACK/NACK (acknowledgement/negative ACK)/downlink data for uplink transmission.

In addition, PUCCH (physical uplink control channel)/PUSCH (physical uplink shared channel)/PRACH (physical random access channel) respectively refer to sets of resource elements carrying UCI (uplink control information)/uplink data/random access signal.

In particular, resource elements (REs) allocated or belonging to PDCCH/PCFICH/PHICH/PDSCH/PUCCH/PUSCH/PRACH are referred to as PDCCH/PCFICH/PHICH/PDSCH/PUCCH/PUSCH/PRACH REs or PDCCH/PCFICH/PHICH/PDSCH/PUCCH/PUSCH/PRACH resources.

Accordingly, transmission of PUCCH/PUSCH/PRACH by a UE corresponds to transmission of UCI/uplink data/random access signal on PUSCH/PUCCH/PRACH. In addition, transmission of PDCCH/PCFICH/PHICH/PDSCH by a BS corresponds to transmission of DCI/downlink data on PDCCH/PCFICH/PHICH/PDSCH.

Mapping of ACK/NACK information to a specific constellation point corresponds to mapping of the ACK/NACK information to a specific complex modulation symbol. In addition, mapping of ACK/NACK information to a specific complex modulation symbol corresponds to modulation of the ACK/NACK information into the specific complex modulation symbol.

FIG. 1 illustrates configurations of a UE and a BS to which the present invention is applicable. The UE serves as a transmitter on uplink and operates as a receiver on downlink. The BS operates as a receiver on uplink and functions as a transmitter on downlink.

Referring to FIG. 1, the UE and the BS respectively include antennas 500a and 500b for receiving information, data, signals or messages, transmitters 100a and 100b for transmitting information, data, signals or messages by controlling the antennas, receivers 300a and 300b for receiving information, data, signals or messages by controlling the antennas, and memories 200a and 200b temporarily or permanently storing information regarding the wireless communication system. In addition, the UE and the BS respectively include processors 400a and 400b connected to components such as the transmitters, receivers and memories and configured to control the components.

The transmitter 100a, the receiver 300a, the memory 200a and processor 400a included in the UE may be implemented as independent components by respective chips or two or more thereof may be implemented as a single chip. The transmitter 100b, the receiver 300b, the memory 200b and processor 400b included in the BS may be implemented as independent components by respective chips or two or more thereof may be implemented as a single chip. The transmitter and receiver may be integrated into a transceiver in the UE or BS.

The antennas 500a and 500b transmit signals generated in the transmitters 100a and 100b to the outside or receive external signals and deliver the received signals to the receivers 300a and 300b. The antennas 500a and 500b are also called antenna ports. An antenna port may correspond to a physical antenna or a combination of a plurality of physical antennas. A transceiver supporting MIMO (multiple input multiple output) for transmitting/receiving data using multiple antennas may be connected to two or more antennas.

The processors 400a and 400b control the overall operation of components or modules included in the UE or BS. Particularly, the processors 400a and 400b may execute various control functions for performing the present invention, a MAC (medium access control) frame variation control function according to service characteristics and propagation environment, a power saving mode function for controlling idle operation, a handover function, authentication and encoding functions, etc. The processors 400a and 400b may be called controllers, microcontrollers, microprocessors or microcomputers. The processors 400a and 400b may be implemented by hardware, firmware, software or a combination thereof.

In hardware implementation, ASICs (application specific integrated circuits), DSPs (digital signal processors), DSPDs (digital signal processing devices), PLDs (programmable logic devices), FPGAs (field programmable gate arrays), etc. configured to implement the present invention may be included in the processors 400a and 400b.

In a firmware or software configuration, the embodiments of the present invention may be implemented in the form of a module, a procedure, a function, etc. Firmware or software configured to implement the present invention may be included in the processors 400a and 400b or stored in the memories 200a and 200b and executed by the processors 400a and 400b.

The transmitters 100a and 100b perform predetermined coding and modulation on a signal or data, which is scheduled by the processors 400a and 400b or a scheduler connected to the processors and transmitted to the outside, and transmit the modulated signal or data to the antennas 500a and 500b. The transmitters 100a and 100b and the receivers 300a and 300b of the UE and BS may be configured in a different manner according to a procedure of processing a transmitted signal and a received signal.

The memories 200a and 200b may store programs for processing and control of the processors 400a and 400b and temporarily store input/output information. Furthermore, the memories 200a and 200b may be used as buffers. The memories may be implemented using flash memory, a hard disc, a multimedia card micro type or card type memory (e.g. SD or XD memory), a random access memory (RAM), a static RAM (SRAM), a read-only memory (ROM), an electrically erasable programmable read-only memory (EEPROM), a programmable ROM (PROM), a magnetic memory, a magnetic disc, an optical disc, etc.

A description will be given of a femto cell.

Femto is a prefix in the metric system denoting a factor of $10^{-15}$. A femto cell refers to a small, low-power indoor BS. While the femto cell is used in the same sense as a pico cell, the femto cell has enhanced functions. The femto cell is a small cellular BS connected to a wideband router and can link audio and video data of 3G systems as well as 2G systems to a backbone network of a mobile network operator through a DSL link.

The femto cell has the following advantages.

Recently, an investigation report on the femto cell that can promote propagation of 3G and widen indoor coverage has been presented. It is expected that the number of femto cell UE users in the world will reach one hundred two millions and thirty-two million access points (APs) will be installed. Stuart Carlaw, chief analyst of ABI Research, said that indoor coverage improvement in technologies such as W-CDMA, HSDPA, EVDO, etc. is very important. Furthermore, he said that the femto cell has strategic and economic advantages since the femto cell routes traffic through IP networks, thereby improving network quality and capacity and reducing OPEX invested by mobile network operators in backhaul dedicated lines.

The femto cell can increase cell coverage and improve audio service quality. Furthermore, mobile network operators expect complete adaptation of subscribers to 3G by providing data service through the femto cell. The femto cell can be called a "femto base station (FBS)" or "femto base transceiver station (BTS)".

The femto cell has the following advantages.
1. Cell coverage improvement
2. Infrastructure cost decrease
3. New service offering
4. Acceleration of fixed mobile convergence (FMC)

One or more femto cells can be grouped on a service basis or an area basis to constitute a femto cell group. For example, a femto cell group permitted to access only a specific UE can be called a "closed subscriber group (CSG) ". An FBS can check CSG identifier (CSG ID) of a UE and allow access to only UEs included in CSG.

Figure 2:
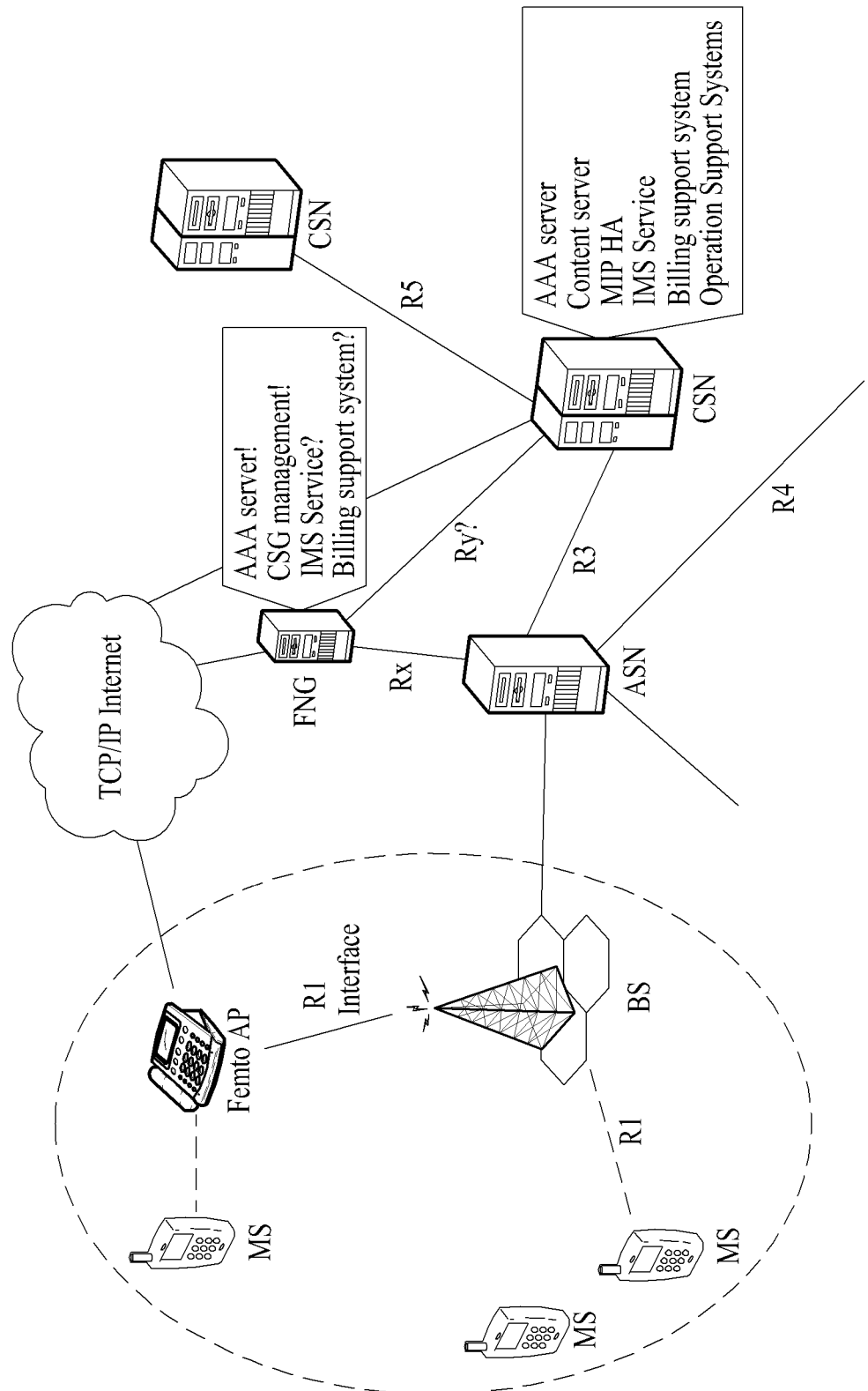
FIG. 2 illustrates an exemplary network architecture including a femto base station (FBS)

FIG. 2 illustrates an exemplary network structure including an FBS.

An FBS is an entity newly added to the existing network. Accordingly, the network structure changes as the FBS is used. Since the FBS can directly access the Internet to function as a BS, the FBS can execute almost all functions of the normal macro BS. In addition, the FBS can receive data from the normal macro BS and relay the data to a UE.

FIG. 2 illustrates a femto network gateway (FNG) added to the existing network. The FNG can communicate with an access service network (ASN) and a connectivity service network (CSN). The FNG can use an Rx interface for communication with the ASN and use an Ry interface for communication with the CSN.

The FBS can be provided with a service from the CSN through the FNG by directly accessing the Internet through TCP/IP. A UE linked to the FBS can be provided with functions of authentication, IP multimedia subsystem (IMS), etc. from the FNG or CSN.

The FBS is linked to a BS through an R1 interface. This represents that the FBS can receive a downlink (DL) channel of a macro BS. The FBS can transmit a control signal to the macro BS.

When the FBS is installed, the FBS can acquire a located based neighbor list from a core network.

An FBS according to the present invention can be located in a network, the coverage area of at least one macro BS, a macro cell or an area corresponding to at least one paging group.

The term cording t list" used in the specification means a set of neighbor BSs to which the corresponding BS can hand over, that is, a set of 1-hop neighbor BSs. The neighbor list can include a macro BS, a relay station and an FBS.

A description will be given of methods for acquiring femto cell network topology in IEEE 802.16m.

A method for manually acquiring femto cell network topology is described first.

A macro BS can broadcast information about an FBS belonging to an overlay network to UEs through a neighbor advertisement message AAI_NBR-ADV and the FBS can broadcast a list of neighbor BSs thereof to the UEs. Here, a neighbor list broadcast by the macro BS in the overlay network differs from the neighbor list broadcasted by the FBS. The overlay network includes information about a BS included in the coverage thereof or a neighbor BS of the BS in the neighbor list, whereas the FBS includes information about BSs belonging to the coverage thereof, which is smaller than the coverage of the overlay network, or BSs located proximal to the BSs.

A method for actively acquiring femto cell network topology will now be described. A UE broadcasts a signal advertising the same such that FBSs recognize presence of the UE and request the UE to scan neighbor BSs. On the contrary, an FBS can broadcast a signal advertising the same such that neighbor UEs can recognize the presence of the FBS and perform additional operations (e.g. handover or scanning).

To manage a neighbor list by acquiring information about neighbor BSs, an FBS can obtain information about the current network topology by requesting a core network or UEs to provide the same, in general.

Figure 3:
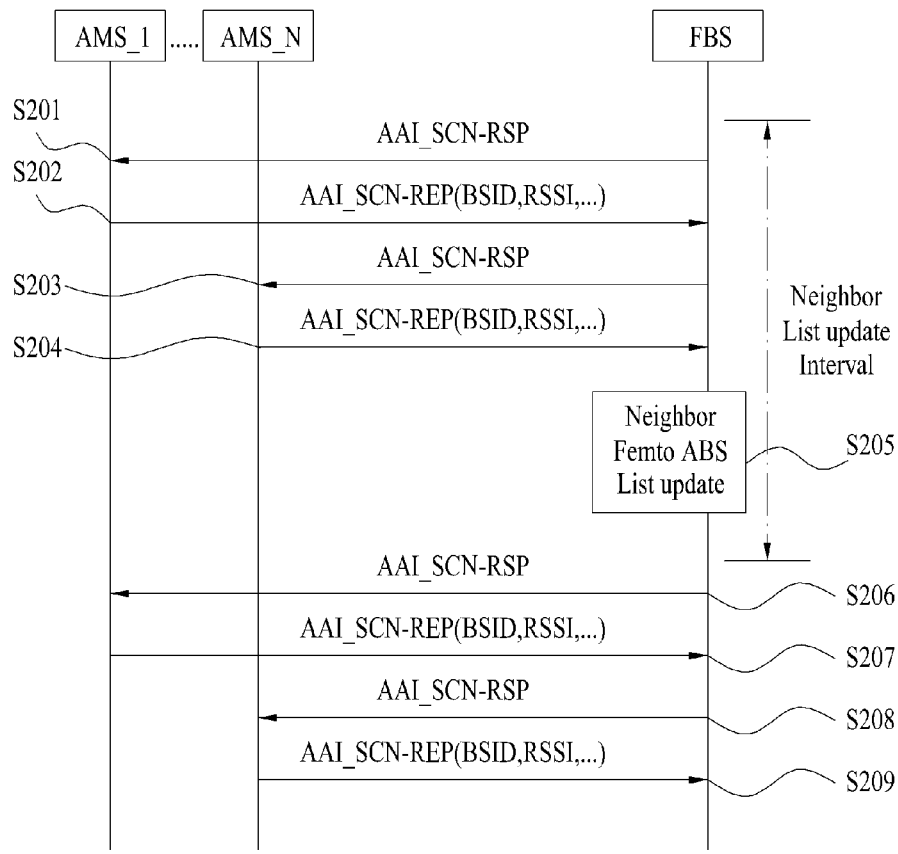
FIG. 3 illustrates an exemplary procedure through which a normal FBS requests a UE to perform scanning.

FIG. 3 illustrates an exemplary procedure through which a normal FBS requests UEs to perform scanning.

Referring to FIG. 3, the FBS can request UEs served thereby to scan neighbor BSs through a scan response message AAI_SCN-RSP in a neighbor list update interval irrespective of a neighbor list included in AAI_NBR-ADV message broadcast thereby (S201 and S203).

The FBS can receive a scan report message AAI_SCN-REP from each UE as a response to the scan response message (S202 and S204).

The scan report message may include a BS identifier (BSID) of a detected neighbor BS and a receive signal strength indicator (RSSI) as result of scanning operations of the UEs.

Figure 4:
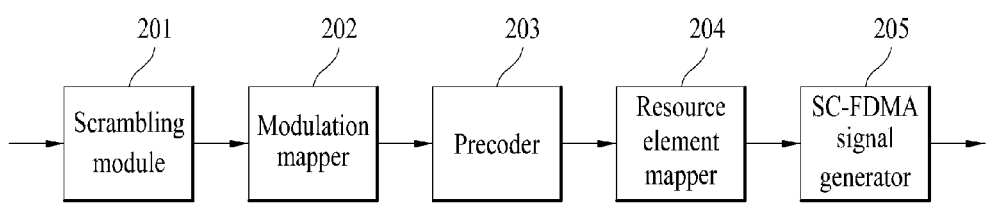
FIG. 4 illustrates a signal processing procedure through which a UE transmits an uplink signal.

FIG. 4 illustrates a signal processing procedure through which a UE transmits an uplink signal. Referring to FIG. 4, the transmitter 100a included in the UE may include a scrambling module 201, a modulation mapper 202, a precoder 203, a resource element mapper 204 and an SC-FDMA signal generator 205.

To transmit the uplink signal, the scrambling module 201 of the UE may scramble the uplink signal using a scrambled signal. The scrambled signal is input to the modulation mapper 202 in which the scrambled signal is modulated into complex symbols using binary phase shift keying (BPSK), quadrature phase shift keying (QPSK) or 16-quadrature amplitude modulation (QAM)/64-QAM according to signal type and/or channel status. The modulated complex symbols are processed by the precoder 203, and then applied to the resource element mapper 204. The resource element mapper 204 may map the complex symbols to time-frequency resource elements. The signal processed in this manner may passed through the SC-FDMA signal generator 205 and transmitted to a BS through an antenna.

Figure 5:
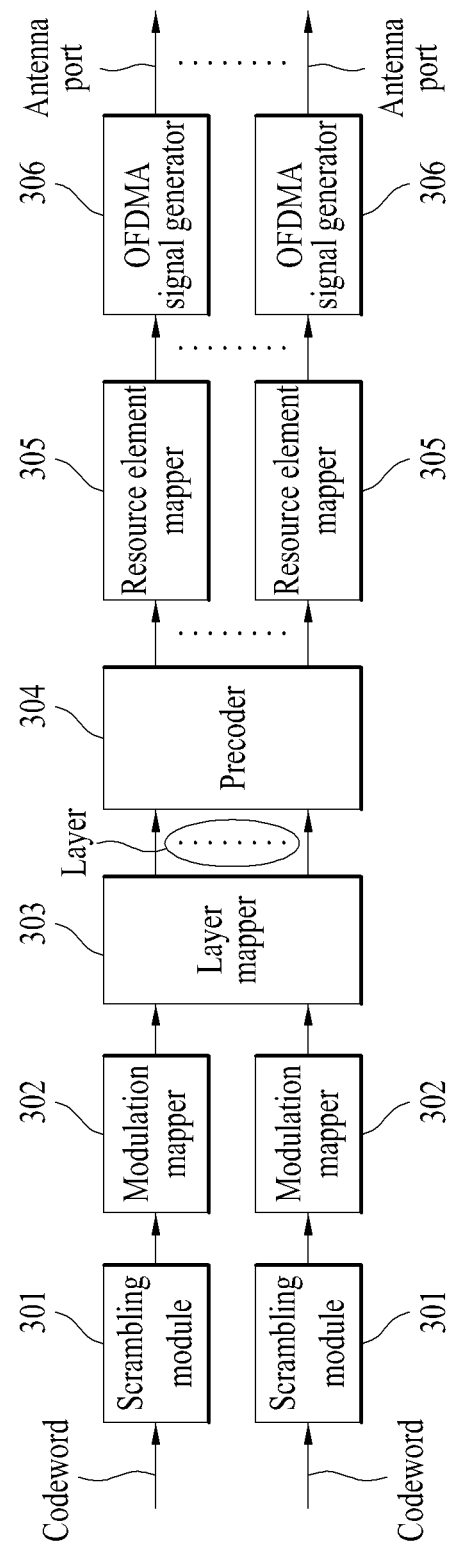
FIG. 5 illustrates a signal processing procedure through which a BS transmits a downlink signal.

FIG. 5 illustrates a signal processing procedure through which the BS transmits a downlink signal. Referring to FIG. 5, the transmitter 100b included in the BS may include a scrambling module 301, a modulation mapper 302, a layer mapper 303, a precoder 304, a resource element mapper 305 and an OFDMA signal generator 306.

To transmit a signal or one or more codewords on downlink, the signal or codewords may be modulated into complex symbols through the scrambling module 301 and the modulation mapper 302, similarly to FIG. 4. Then, the complex symbols are mapped to a plurality of layers by the layer mapper 303. The layers may be multiplied by a precoding matrix in the precoder 304 and allocated to transport antennas. The processed signals for the respective antennas may be mapped to time-frequency resource elements by the resource element mapper 305 and passed through the OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 4 and 5.

Figure 6:
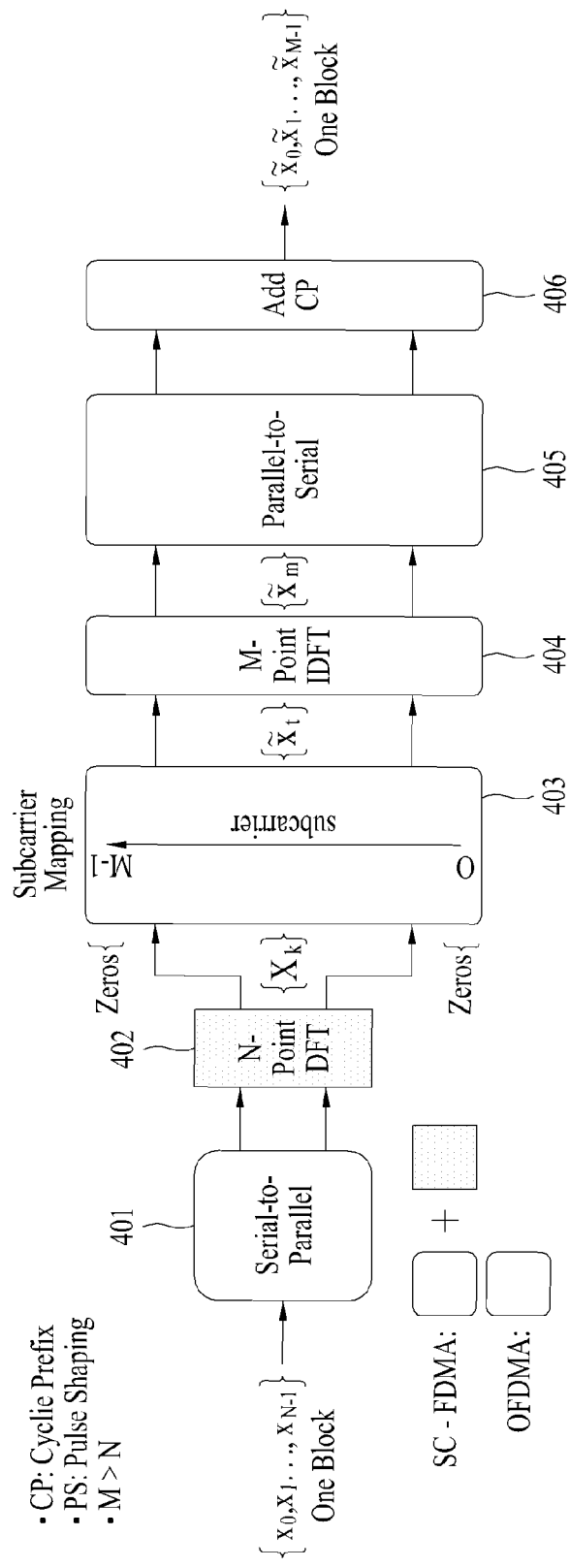
FIG. 6 illustrates SC-FDMA and OFDMA to which the present invention is applied.

FIG. 6 illustrates SC-FDMA and OFDMA to which the present invention is applied. 3GPP employs OFDMA on downlink and SC-FDMA on uplink.

Referring to FIG. 6, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402. The N-point DFT module 402 cancels some parts of the influence of IDFT of the M-point IDFT module 404 such that a transmission signal has single carrier properties.

SC-FDMA needs to satisfy the single carrier properties. FIG. 7 illustrates examples of mapping input symbols to subcarriers in the frequency domain, which satisfies the single carrier properties. When DFT symbols are allocated to subcarriers according to one of FIGS. 7(a) and 7(b), a transmission signal satisfying the single carrier properties can be obtained. FIG. 7(a) illustrates a localized mapping scheme and FIG. 7(b) illustrates a distributed mapping scheme.

Figure 8:
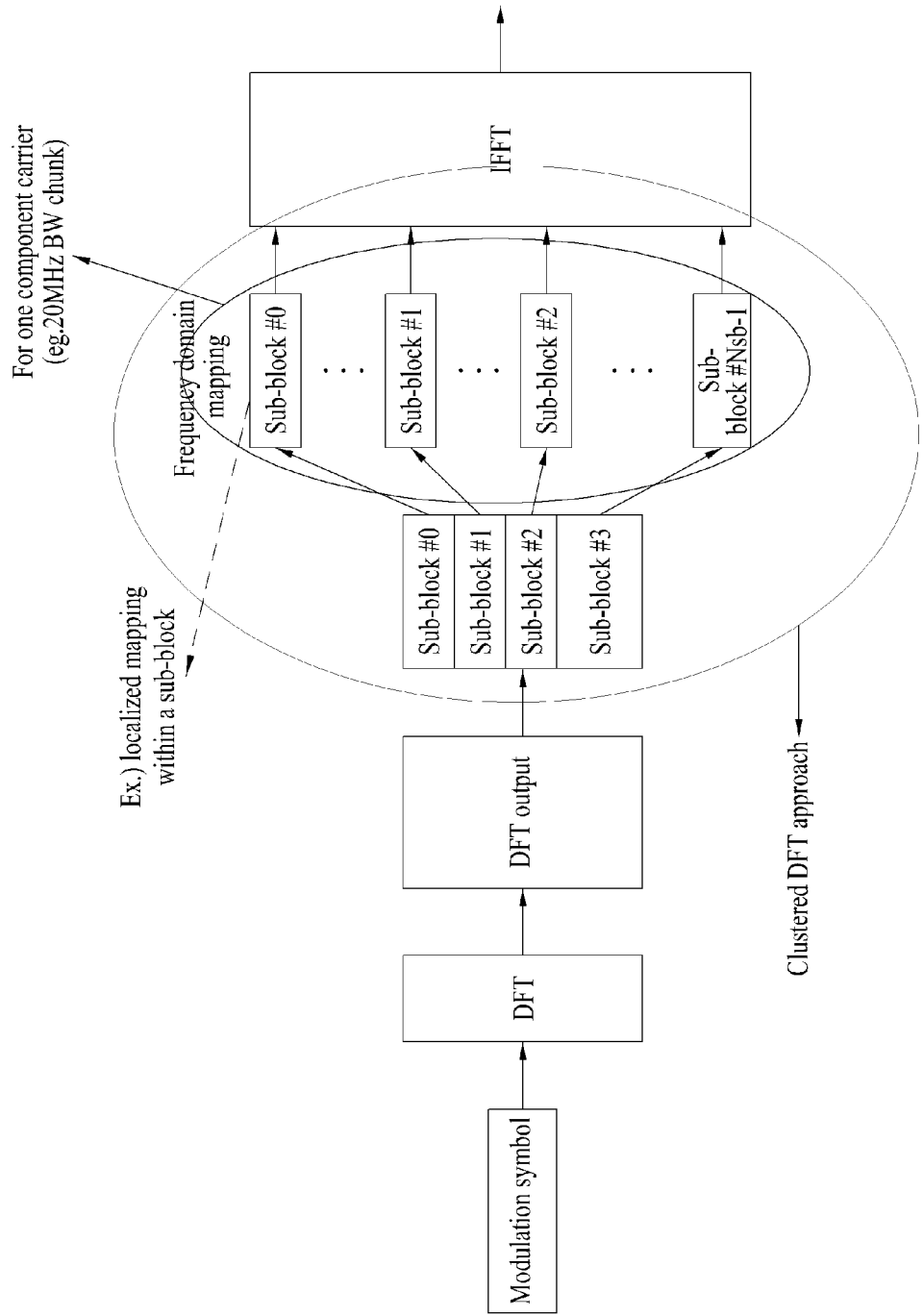
FIG. 8 illustrates a signal processing procedure for mapping DFT process output samples to a single carrier in clustered SC-FDMA.

Clustered DFT-s-OFDM may be employed by the transmitters 100a and 100b. Clustered DFT-s-OFDM, which is a modified version of SC-FDMA, divides a signal that has passed through a precoder into several sub-blocks and discretely maps the sub-groups to subcarriers. FIG. 8 illustrates an example of mapping input symbols to a single carrier according to clustered DFT-s-OFDM.

Figure 9:
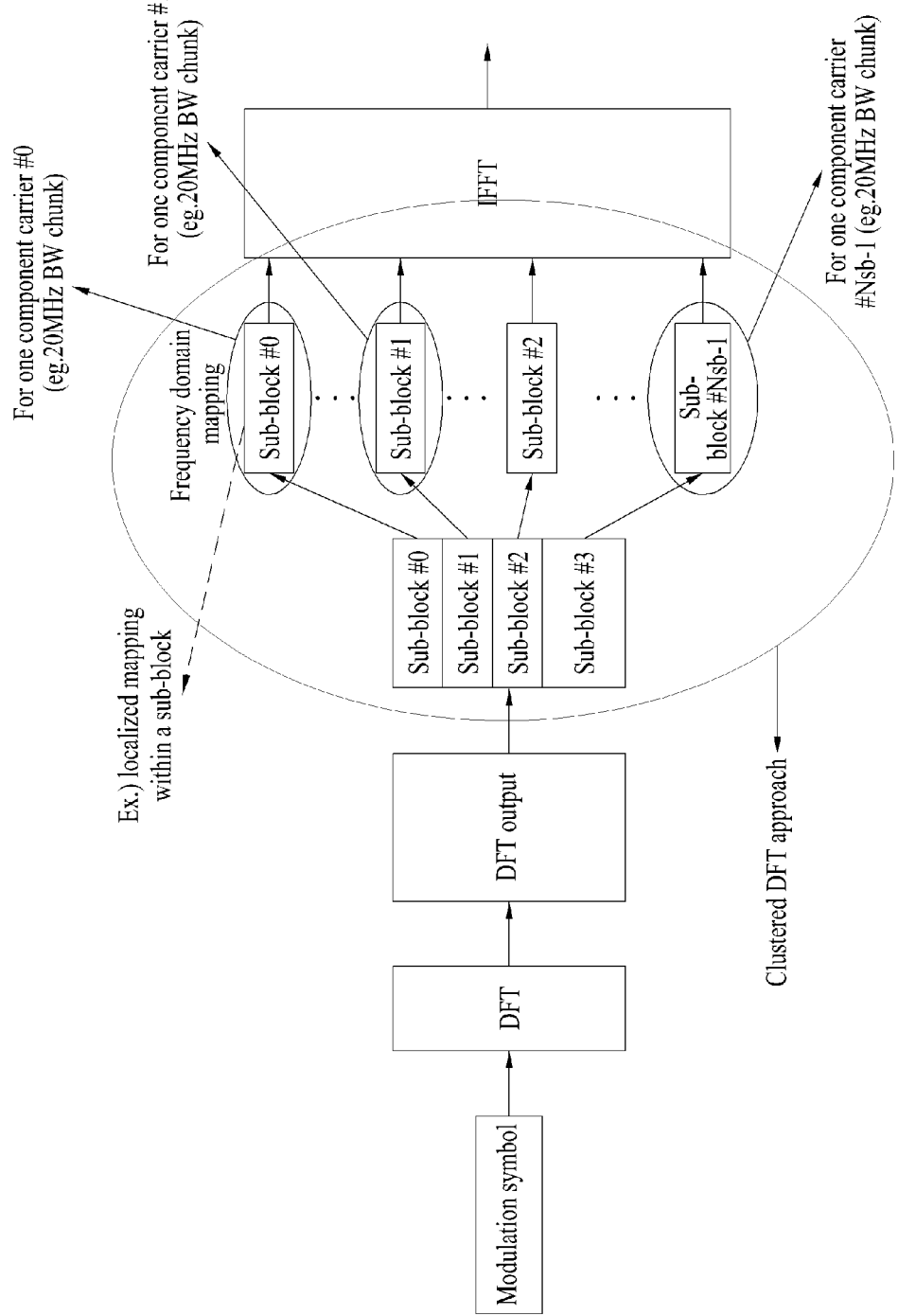
FIGS. 9 and 10 illustrate signal processing procedures for mapping DFT process output samples to multiple carriers in clustered SC-FDMA.
Figure 10:
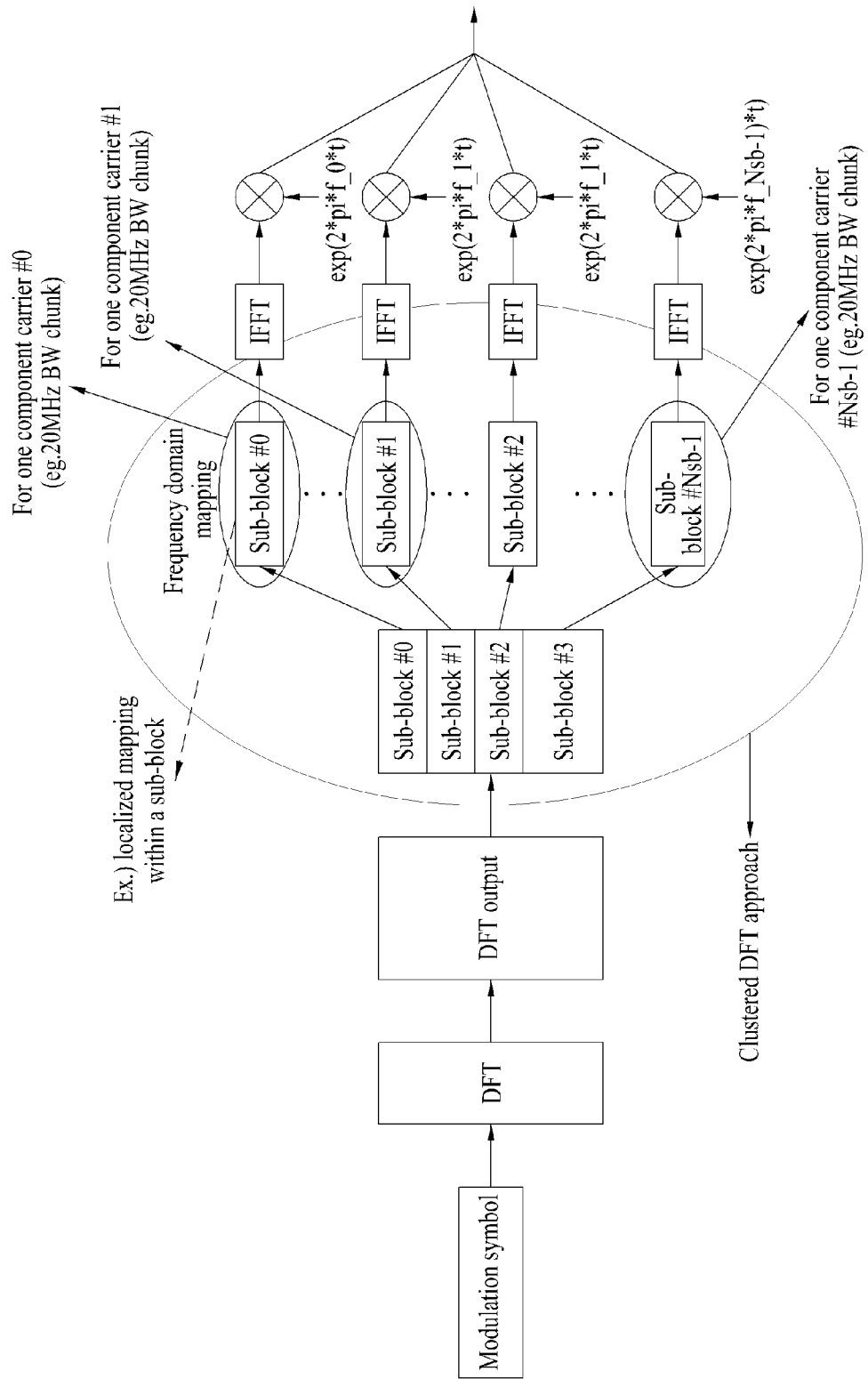

FIG. 8 illustrates a signal processing procedure for mapping DFT process output samples to a single carrier in clustered SC-FDMA. FIGS. 9 and 10 illustrate signal processing procedures for mapping DFT process output samples to multiple carriers in clustered SC-FDMA. FIG. 8 shows an example of application of intra-carrier clustered SC-FDMA while FIGS. 9 and 10 show examples of application of inter-carrier clustered SC-FDMA. FIG. 9 illustrates a case in which a signal is generated through a single IFFT block when subcarrier spacing between neighboring component carriers is set while component carriers are contiguously allocated in the frequency domain. FIG. 10 shows a case in which a signal is generated through a plurality of IFFT blocks when component carriers are non-contiguously allocated in the frequency domain.

Figure 11:
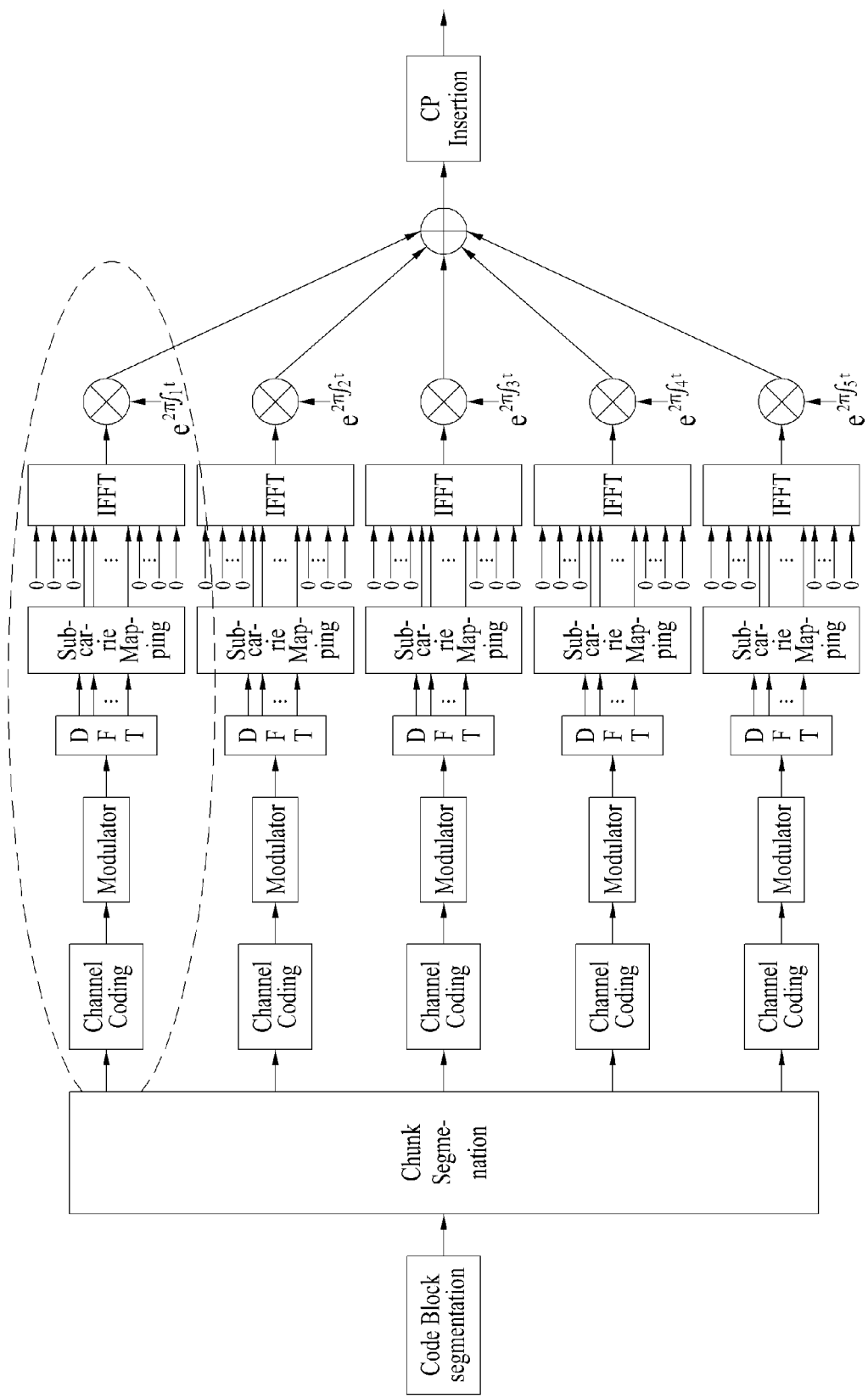
FIG. 11 illustrates a signal processing procedure of segmented SC-FDMA.

FIG. 11 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT-s-OFDMA. Referring to FIG. 11, segmented SC-FDMA is characterized in that all time-domain modulation symbols are divided into N groups (N being an integer greater than 1) and a DFT process is performed on a group-by-group basis to relieve the single carrier property constraint.

Figure 12:
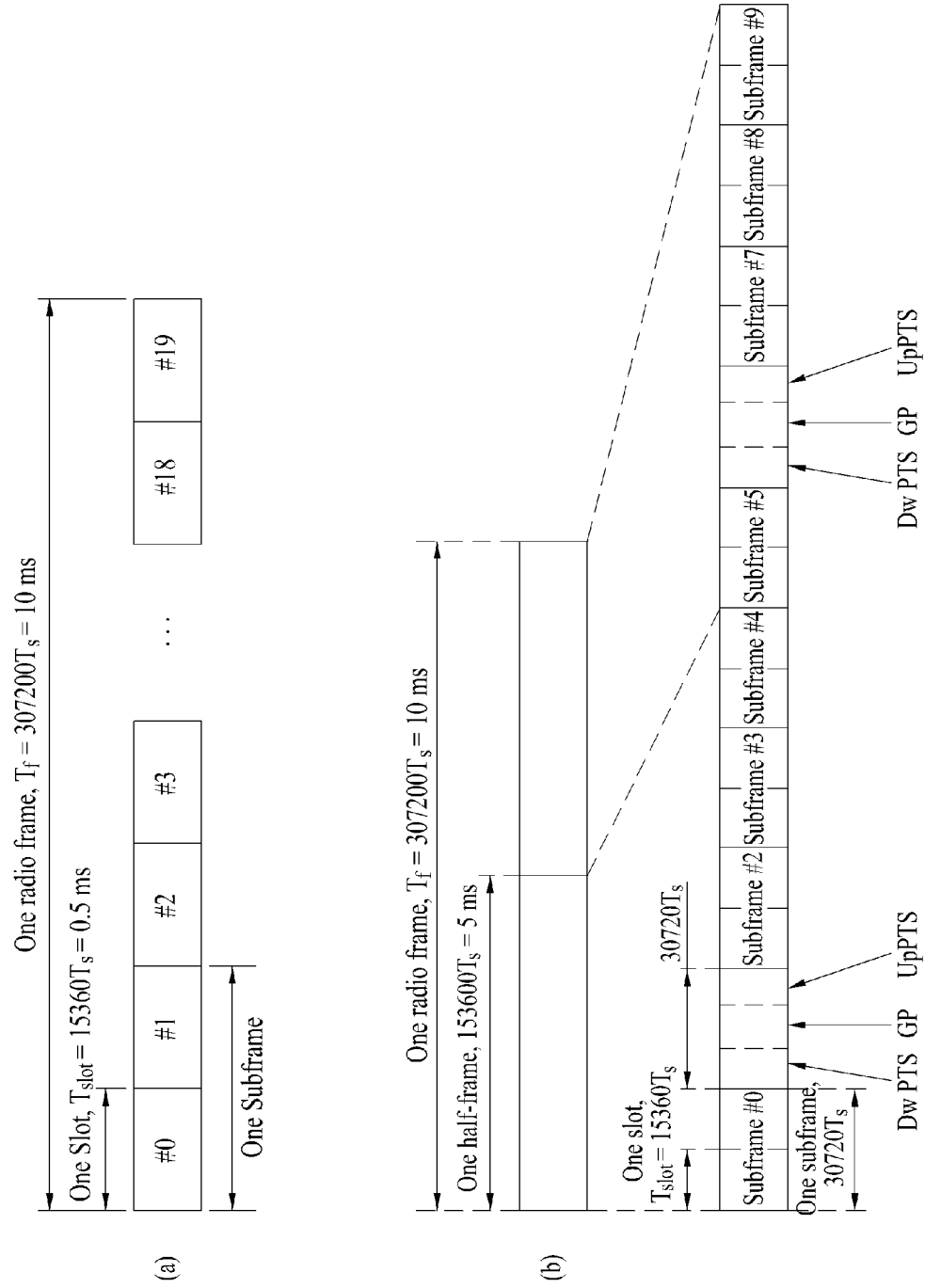
FIG. 12 illustrates exemplary radio frame structures used in a wireless communication system.

FIG. 12 illustrates exemplary radio frame structures used in a wireless communication system. FIG. 12(a) illustrates a radio frame according to frame structure type 1 (FS-1) of 3GPP LTE/LTE-A and FIG. 12(b) illustrates a radio frame according to frame structure type 2 (FS-2) of 3GPP LTE/LTE-A. The frame structure of FIG. 12(a) can be applied to FDD (frequency division duplex) mode and half FDD (H-FDD) mode. The frame structure of FIG. 12(b) can be applied to TDD (time division duplex) mode.

Referring to FIG. 12, a radio frame is 10 ms (307200 Ts) long in 3GPP LTE/LTE-A, including 10 equally sized subframes. The 10 subframes of the radio frame may be numbered. Herein, $T_s$ is a sampling time, expressed as $T_s=1/(2048 \times 15 \text{ kHz})$. Each subframe is 1ms long and includes two slots. The 20 slots of the radio frame may be sequentially numbered from 0 to 19. Each slot has a length of 0.5 ms. A time required to transmit one subframe is defined as a transmission time interval (TTI). Time resources may be identified by a radio frame number (or a radio frame index), a subframe number (or a subframe index), and a slot number (or a slot index).

Different radio frames may be configured for different duplex modes. For example, downlink transmission is distinguished from uplink transmission by frequency in the FDD mode. Therefore, a radio frame includes only downlink subframes or only uplink subframes.

On the other hand, since downlink transmission is distinguished from uplink transmission by time in the TDD mode, the subframes of a radio frame are divided into downlink subframes and uplink subframes.

Figure 13:
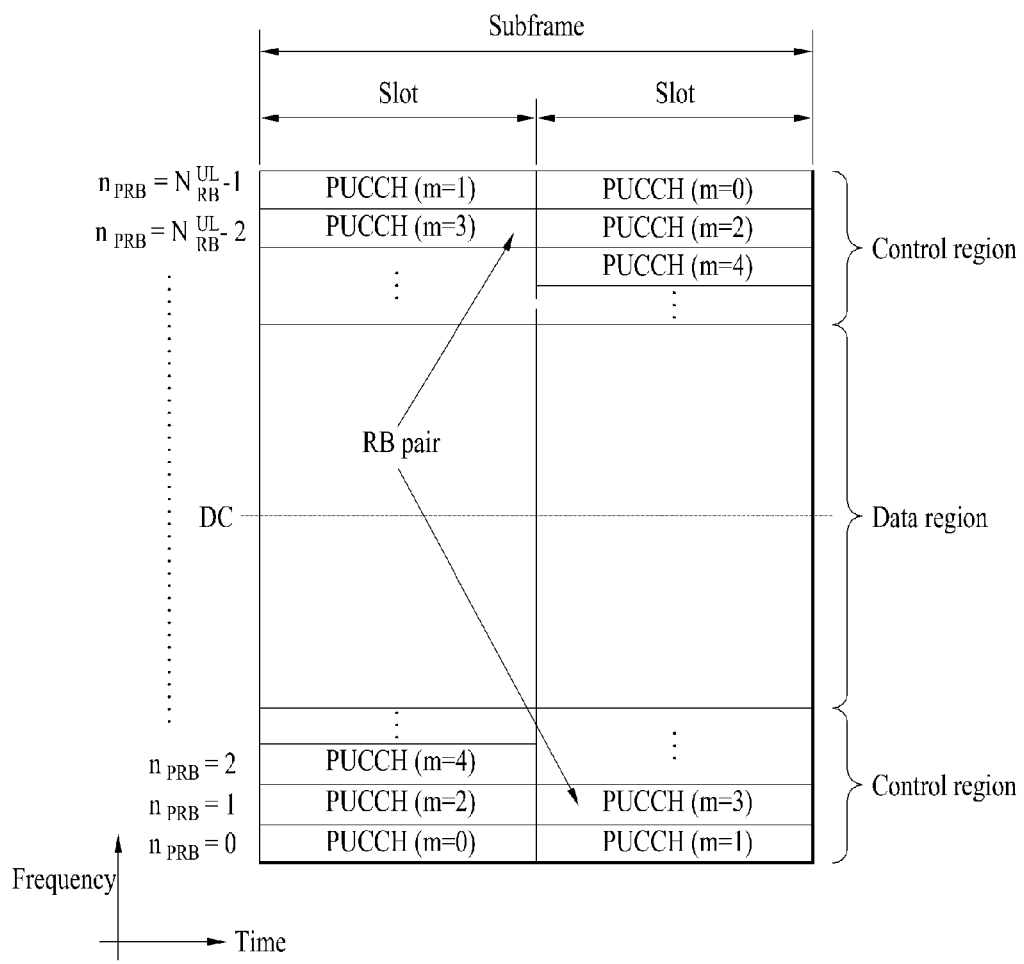
FIG. 13 illustrates an uplink subframe structure.

FIG. 13 illustrates an uplink subframe structure to which the present invention is applied. Referring to FIG. 13, an uplink subframe may be divided into a control region and a data region in the frequency domain. At least one PUCCH may be allocated to the control region to transmit uplink control information (UCI). In addition, at least one PUSCH may be allocated to the data region to transmit user data. If a UE adopts SC-FDMA in LTE release 8 or release 9, the UE cannot transmit a PUCCH and a PUSCH simultaneously in order to maintain the single carrier property.

Figure 14:
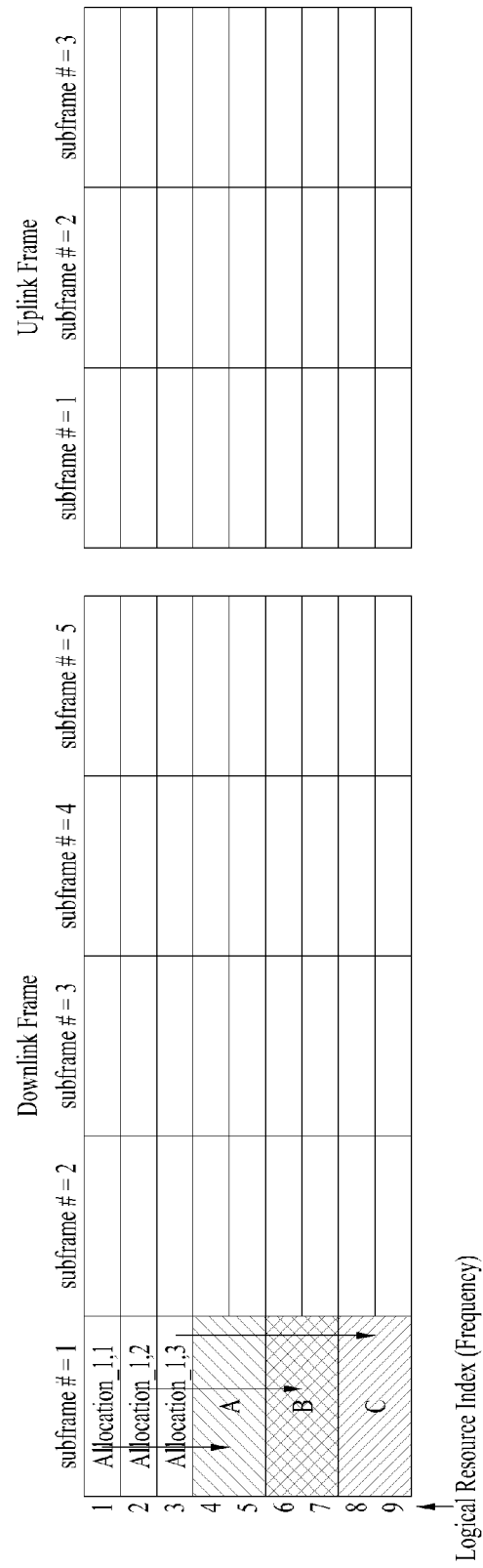
FIG. 14 illustrates a basic TDD frame structure in relation to the present invention.

FIG. 14 illustrates a basic TDD frame structure.

Referring to FIG. 14, the basic TDD frame includes a DL control signal for allocating a downlink or uplink resource, a downlink data region in which downlink data can be transmitted and an uplink data region in which uplink data can be transmitted.

In a normal OFDMA/SC-FDMA system, a resource region has a 2-dimensional resource structure corresponding to a group of frequency resources (subcarrier group) with specific indices and OFDM symbols with specific indices.

IEEE 802.16e/802/16m or 3GPP LTE/LTE-A also has the above-mentioned structure.

That is, DL control signals, Allocation_1,1, Allocation_1,2 and Allocation_1,3, are assigned to a DL control region (corresponding to logical resource indices 1, 2 and 3 in FIG. 14) to allocate resources A, B and C.

The DL control signal region is multiplexed with a data region according to FDM in IEEE 802.16m and multiplexed with the data region according to TDM in 802.16e/LTE/LTE-A.

Figure 15:
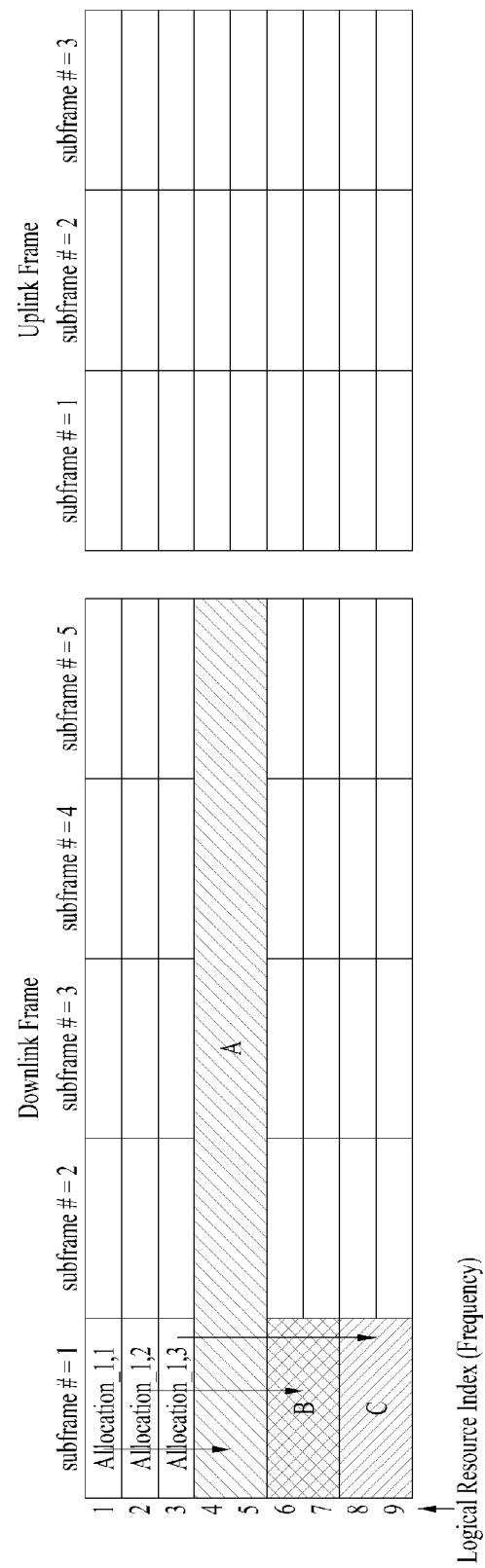
FIG. 15 illustrates an example of setting a long TTI in relation to the present invention.

In the case of 802.16m, a long TTI can be set, as illustrated in FIG. 15.

Referring to FIG. 15, when a long TTI is set for Allocation_1,1, a band A is continuously allocated in a DL frame.

Figure 16:
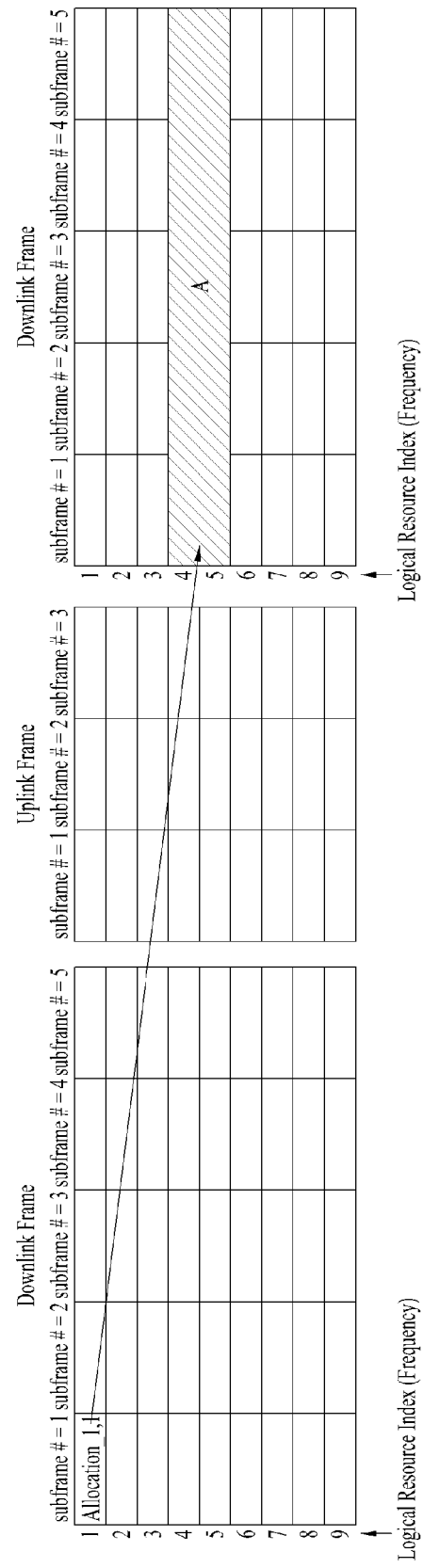
FIG. 16 illustrates a method of allocating an allocation signal to a following frame when a UE does not secure a time to detect the allocation signal.

If a UE cannot secure time to detect an allocation signal, the allocation signal may be assigned to the following frame, as illustrated in FIG. 16.

Figure 17:
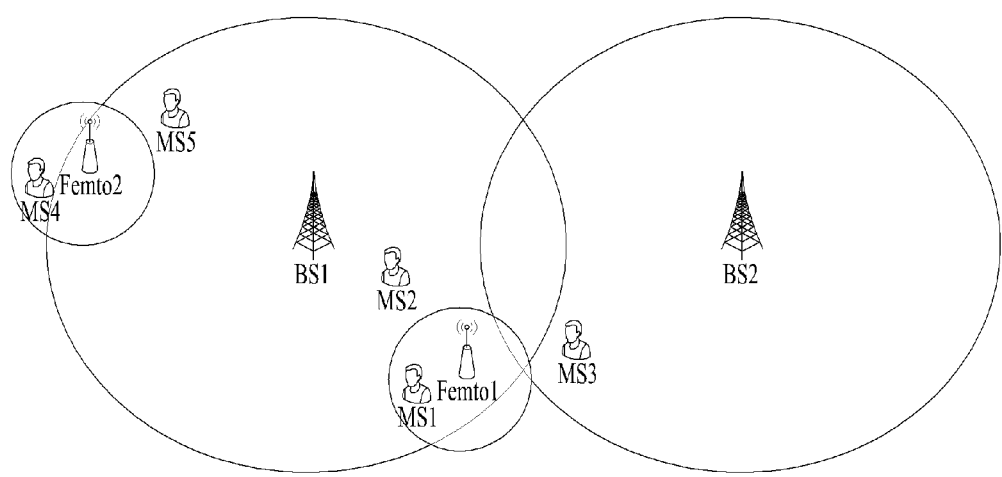
FIG. 17 illustrates a multi-layer structure according to the present invention.

FIG. 17 illustrates an exemplary multi-layer structure in relation to the present invention.

In FIG. 17, BS1 and BS2 denote BSs of a macro cell, MS2 and MS5 denote macro MSs linked to BS1, MS3 denotes a macro MS linked to BS2, MS1 represents a femto MS linked to Femto1 and MS4 represents an MS linked to Femto2.

In FIG. 17, a large circle represents the coverage of a macro BS and a small circle represents the coverage of a femto BS. That is, since the macro BS performs transmission with high power and the femto BS performs transmission with low power, the macro BS and the femto BS have different coverages.

In this network layout, the following problems may be encountered.

First Case

Macro downlink and femto downlink: When a macro BS performs downlink transmission to MS2, downlink performance of MS2 is deteriorated due to a downlink signal of a BS of Femto1 (close to MS2).

Second Case

Macro downlink and femto uplink: When the macro BS performs downlink transmission to MS2, downlink performance of MS2 is deteriorated due to a signal of MS1 (femto MS close to MS2) of Femto1.

Third Case

Macro uplink, femto downlink and Femto1 close to BS1: When the macro MS2 performs uplink transmission to BS1, uplink performance of MS2 is deteriorated due to a downlink signal of Femto1 (close to BS1).

Fourth Case

Macro uplink, femto uplink and Femto1 close to BS1: When the macro MS2 performs uplink transmission to BS1, uplink performance of MS2 is deteriorated due to an uplink signal of MS1 (femto MS close to BS1) of Femto1.

Furthermore, uplink performance of MS1 may be deteriorated due to a signal of MS2 (macro MS close to Femto1).

Fifth Case

Macro uplink and femto downlink: When the macro MS2 performs uplink transmission to BS1, downlink performance of MS1 is deteriorated due to a signal of MS2 (macro MS close to MS1).

Sixth Case

Macro uplink and femto uplink: When the macro MS2 performs uplink transmission to BS1, uplink performance of MS1 is deteriorated due to a signal of MS2 (macro MS close to Femto1).

Therefore, the present invention proposes a method for solving the above-described problems. A description will be given of the method provided by the present invention in detail.

As illustrated in FIG. 16, a macro BS transmits a downlink allocation signal to an MS, and a macro MS allocated to the band A can transmit a signal in a predetermined region corresponding to the band A with predetermined power (P).

Here, the predetermined region may be part of an uplink resource region or part of a downlink resource region.

Femto BSs or femto BSs and femto MSs can measure distances therebetween and a macro MS to which downlink signals will be transmitted in a specific band by detecting the signal transmitted by the macro MS.

Alternatively, the femto BSs or femto BSs and femto MSs may measure long term statistics (average sense and long term fading) of the macro MS to which downlink signals will be transmitted in a specific resource by detecting the signal.

In addition, the femto BSs or femto BSs and femto MSs may measure short term statistics (short term fading, channel impulse response, etc.).

A femto BS or femto MS in the first case can allocate downlink resources to the corresponding band and a femto BS or femto MS in the second case can allocate uplink resources to the corresponding band upon determining that the performance of the allocated macro MS is not significantly affected by the measurement result.

If it is determined that the performance of the allocated macro MS is significantly affected, downlink resources are not allocated to the corresponding band in the first case and uplink resources are not allocated to the corresponding band in the second case.

When the femto BS or femto MS in the third and fourth cases affects uplink performance of the macro MS, the femto BS or femto MS performs channel estimation using a downlink common reference signal (midamble of 802.16e/m, C-RS of LTE, CSI-RS of LTE-A, etc.) and then enables transmission with low power to the corresponding macro BS (e.g. null forming).

Here, null forming, an interference mitigation scheme using multiple antennas, refers to a technique of decreasing or eliminating power in given a direction.

If the femto BS or femto MS can detect even short term fading in all cases, beamfoming may be performed using the detected information through a method most suitable for the femto BS or femto MS.

For example, the femto BS or MS can perform maximum rate transmission (MRT) to improve the performance thereof upon determining that performance of the corresponding macro MS is not largely affected. When it is determined that performance of the macro MS is largely affected, interference nulling (IN) can be performed to minimize interference or a beamforming process in between MRT and IN can be performed.

The present invention will now be described in more detail with reference to FIG. 18.

Figure 18:
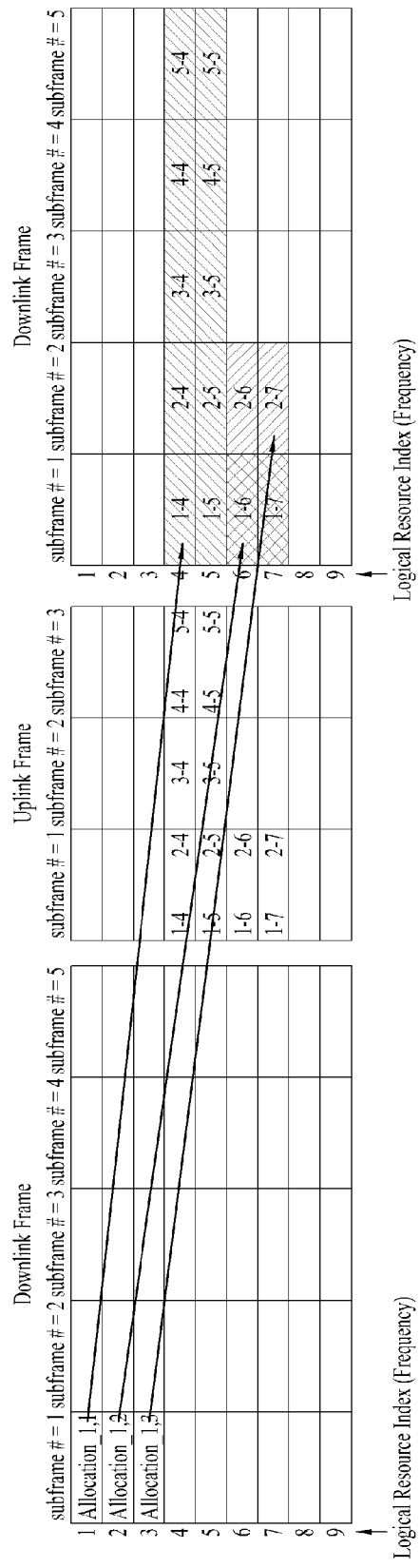
FIG. 18 illustrates a frame structure according to the present invention.

FIG. 18 illustrates a frame structure proposed by the present invention.

In FIG. 18, a specific uplink or downlink resource region is designated and assumed to define a user detection signal (UDS) region.

The UDS region can be composed of one to N unit resources (subcarriers, OFDM symbols, etc.) per downlink resource allocation unit (e.g. subband, LRU, chunk, SLRU, DLRU, etc.).

When a UDS is generated from a plurality of (N) unit resources, different BSs can map different sequences to the resources to additionally detect signals from MSs belonging to other BSs.

Furthermore, to support multi-user downlink transmission, multiple UDSs may be designated per downlink resource allocation unit.

A UDS can be broadcast to all MSs or femto BSs/femto MSs in a cell using a common control signal.

Here, the common control signal may be transmitted per frame or frame group (e.g. per superframe).

Alternatively, a plurality of MSs allocated to a single UDS may simultaneously perform transmission.

Alternatively, a plurality of MSs corresponding to a single UDS may be discriminated using different sequences.

Alternatively, multiple UEs may perform transmission in the same sequence through a single UDS such that a femto BS or femto MS can estimate reception of neighbor MSs thereof in the UDS region, that is, a downlink resource region indicated by the UDS.

For example, it is assumed that K users are allocated to a downlink resource D.

Here, the K users may belong to a single BS or multiple BSs.

If the K users transmit the same signal in the same UDS region, the femto BS or femto MS can roughly measure the state of an MS to which the femto BS or femto MS may apply interference in a specific resource region although the femto BS or femto MS cannot detect short term fading.

That is, if two of the K users are located close to the femto BS/MS that will measure the UDS, signals from (K-2) users do not reach the femto BS/MS and only signals from the two users are combined and transmitted to the femto BS/MS because signal intensity decreases exponentially.

That is, if the intensity of the combined signals is high, this means that the two users are located closer to the femto BS/MS than a desired distance. If the intensity of the combined signals is low, this means that the users are spaced apart from the femto BS/MS by the desired distance or more.

Accordingly, the above-described method can be performed using the signal intensity.

For example, when the UDS signal intensity does not reach a predetermined threshold, the femto BS/MS determines that interference applied by the same to the corresponding MSs is low and transmits a signal in the corresponding resource (particularly, performs MRT).

If the UDS signal intensity exceeds the threshold, the femto BS/MS determines that interference applied by the same to the corresponding MSs is high and does not perform transmission in the corresponding resource or performs transmission through interference nulling.

In addition, statistical characteristics of resource allocation may be used in such a manner that a resource region preferred by a specific MS or a resource region allocated to the specific MS in a macro BS is recognized by a neighboring femto BS or an MS linked thereto.

An MS linked to the macro BS measures radio channel characteristics on the basis of a reference signal transmitted on downlink and transmits feedback information based on the radio channel characteristics such that the macro BS allocates a preferred resource of a specific region to the MS.

A signal (e.g. a sequence, a signal indicating a resource mapping method, information regarding tone selection, etc.) predetermined for a preferred resource region is transmitted in a UDS region of uplink on the basis of the feedback information. The signal can be transmitted through a plurality of MSs and a receiver such as a femto BS/MS can acquire statistical resource allocation characteristics.

Furthermore, the femto BS/MS can perform transmission and reception avoiding resource allocation regions of neighbor UEs on the basis of the resource allocation spectrum (or density).

A macro MS may acquire a resource region preference spectrum (or density) from the femto BS/MS and perform transmission and reception.

In this case, it is possible to use basic uplink sending channels without setting a UDS region of uplink.

That is, the macro MS selects a specific preference resource region based on a reference signal and signals the preference resource region to a BS such that the BS allocates an uplink sounding channel to the MS in the preference resource region. The femto BS/MS can acquire statistical resource allocation characteristics using the uplink sounding channel.

The macro MS may acquire resource region preference spectrum from the femto BS/MS and perform transmission and reception. Here, when the macro MS signals the specific preference resource region to the BS, a downlink preference resource region feedback signal may be used.

Furthermore, the macro MS does not directly signal the preference resource region to the BS and the BS may directly select the preference resource region of the UE based on uplink signals.

While the macro MS transmits the UDS signal and the femto BS or femto MS detects the UDS signal in the above description, an MS that will receive a downlink signal may transmit the UDS signal and a BS or MS may measure the UDS signal irrespective of whether the MS and BS are macro MS and BS or femto MS and BS.

It is assumed that macro BS1 allocates MS1 to downlink resource regions 1-4 to 5-5 using Allocation_1,1, allocates MS5 to downlink resource regions 1-6 and 1-7 using Allocation_1,2 and allocates MS6 to downlink resource regions 2-6 and 2-7 using Allocation_1,3.

Here, MS1 to which downlink resource regions 1-4 to 5-5 is assigned sends a signal in UDS regions corresponding to the downlink resource regions 1-4 to 5-5 with power P.

The power P may be set to the same value or different values for respective MSs.

When the power P is set to different values for the respective MSs, the BS may signal the values of the power P to the MSs or the MSs may determine the power values based on a mathematical expression derived by a specific method, for example, a method of decreasing an interference level below a specific value.

When the power P is set to the same value, the power value can be signaled using a control signal when the power value is configurable or the power value can be fixed to a specific value.

Upon detection of a UDS and measurement of power, the femto BS or femto MS may not perform transmission in a downlink resource region corresponding to the UDS if the measured power exceeds a predetermined threshold.

Furthermore, it is possible to estimate a channel with the UDS and perform null forming such that signal power decreases in the direction of the channel.

Accordingly, interference applied to the macro BS/MS from the femto BS/MS can be reduced according to the present invention.

A description will be given of a new network architecture capable of reducing interference in a network including an FBS.

The network structure to which the present invention is applicable will now be described with reference to FIG. 19.

Figure 19:
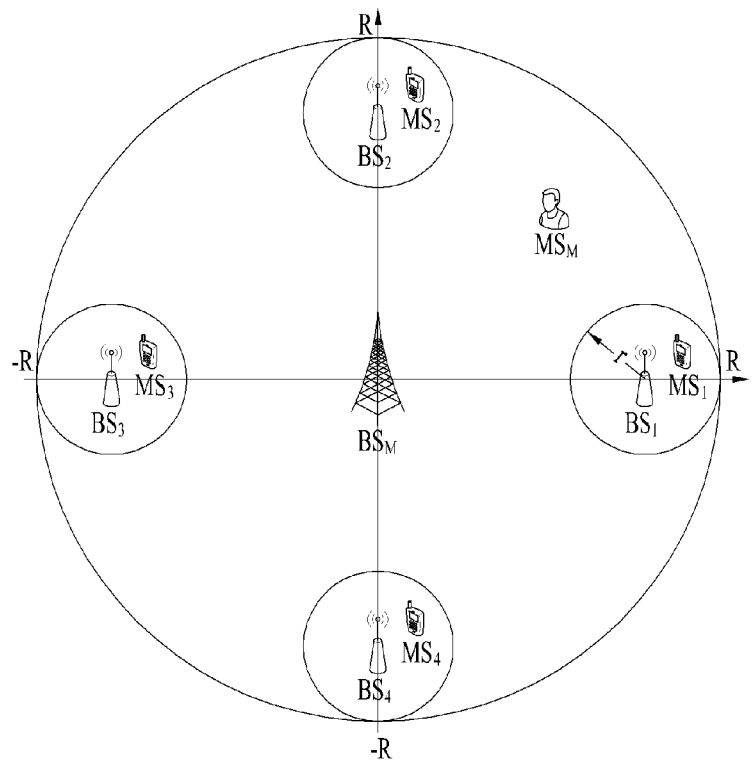
FIG. 19 illustrates an exemplary system architecture to which the present invention is applicable.

In FIG. 19, it is assumed that a single macro BS $BS_M$ is present and only the macro BS operates as a macro BS of the entire system within a predetermined time.

Referring to FIG. 19, it is assumed that N femto BSs $BS_i$ (i=1, N) are present, each femto BS $BS_i$ operates for a single MS for a predetermined time, each MS has a single receive antenna and the macro BS and an i-th femto BS respectively include $N_{t,M}$ and $N_{t,i}$ transmit antennas.

In addition, it is assumed that a wall is present at the boundary of a femto BS having penetration loss of δ dB.

Furthermore, it is assumed that maximum transmit powers for the macro BS and the i-th femto BS are $P_{tx,M}$ and $P_{tx,i}$, respectively.

It is assumed that each femto BS $BS_i$ knows long term statistics and short term statistics for the MS $MS_i$ thereof.

Figure 20:
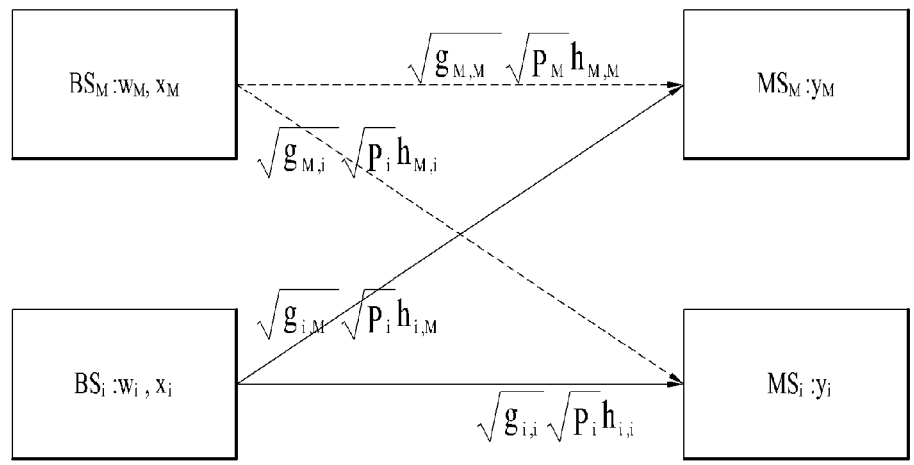
FIG. 20 illustrates a system model to which the present invention is applicable.

FIG. 20 illustrates a system model to which the present invention is applicable.

In FIG. 20, the relationship among the macro BS $BS_M$, femto BSs $BS_i$ (i=1, ..., N) and MSs $MS_i$ can be represented as Equations 1 and 2.

$$y_M = \sqrt{g_{M,M}} \sqrt{p_M} h_{M,M} w_M x_M + \sum_{n=1}^{M} \sqrt{g_{n,M}} \sqrt{p_n} h_{n,M} w_n x_n + n_M$$
$$= \sqrt{g_{M,M}} \sqrt{p_M} h_{M,M} w_M x_M + \sqrt{g_{i,M}} \sqrt{p_i} h_{i,M} w_i x_i + \bar{n}_M$$
[Equation 1]

$$y_i = \sqrt{g_{M,i}} \sqrt{p_M} h_{M,i} w_M x_M + \sqrt{g_{i,i}} \sqrt{p_i} h_{i,i} w_i x_i + \bar{n}_i$$
[Equation 2]

In Equations 1 and 2, all parameters related to subscript M belong to the macro BS or MSs. Here, since $y_i$ denotes a signal received at the i-th MS, $h_{j,i}$ denotes a $1 \times N_{t,j}$ channel vector between the i-th MS and the j-th BS, $w_j$ denotes an $N_{t,j} \times 1$ precoding vector at the j-th BS, $x_i$ represents data of the i-th MS having a variance of $\epsilon_x = 1$, $n_i$ represents additive Gaussian noise having variance of $\sigma_i^2$, $\bar{n}_i$ represents noise plus interference (including interference of BSs other than $BS_M$ and the i-th femto BS) having a variance of $\bar{\sigma}_i^2$, and $g_{j,i}$ includes long term fading (pathloss, shadowing, penetration loss, etc.), $E[hh^H]=N_{t,j}$ is established and. In addition, $p_i$ denotes transmit power in $BS_i p_i \leq P_{tx,i}$.

Here, $MS_M$ transmits a UDS prior to downlink transmission in order to allow all femto BSs to measure short term statistics and long term statistics between $MS_M$ and $BS_i$. Accordingly, in $BS_i$, $h_{i,M}$ and $h_{i,i}$ can be used whereas $h_{M,i}$ and $h_{M,M}$ cannot be used.

Consequently, optimization is performed using information used by BS, only in order to maximize a sum rate.

Therefore, when the system is operated using the existing information, interference may be frequently generated.

The present invention proposes a method for reducing interference in the network structure including a femto BS. This method can improve performance of a macro MS while decreasing performance loss of the femto BS.

The problem generated in the system can be represented as Equation 3.

$$R = \eta_M \log\left(1 + \frac{g_{M,M} p_M |h_{M,M} w_M|^2}{\sigma_M^2 + \sum_{n=1}^{N} g_{n,M} p_n |h_{n,M} w_n|^2}\right) + \sum_{i=1}^{N} \eta_i \log$$
$$\left(1 + \frac{g_{i,i} p_i |h_{i,i} w_i|^2}{\sigma_i^2 + g_{M,i} p_M |h_{M,i} w_M|^2 + \sum_{n=1,n \neq i}^{N} g_{n,i} p_n |h_{n,i} w_n|^2}\right)$$
[Equation 3]

Here, $\eta_M$ and $\eta_i$ respectively denote weights of $MS_M$ and $MS_i$.

A distributed optimization problem in $BS_i$ can be represented as Equation 4.

$$R = \max_{w_i, p_i} \left\{ E\left[\eta_M \log\left(1 + \frac{g_{M,M} p_M |h_{M,M} w_M|^2}{\sigma_M^2 + \sum_{n=1}^{N} g_{n,M} p_n |h_{n,M} w_n|^2}\right) + \right.\right.$$
$$\left.\left. \eta_i \log\left(1 + \frac{(g_{i,i} p_i |h_{i,i} w_i|^2)}{(\sigma_i^2 + g_{M,i} p_M |h_{M,i} w_M|^2 + \sum_{n=1,n \neq i}^{N} g_{n,i} p_n |h_{n,i} w_n|^2)}\right) \right]\right\}$$
[Equation 4]

Equation 4 can be simplified as Equation 5 using Jensen's inequality and the arithmetic and harmonic mean relationship.

$$\bar{R}_i = \max_{w_i, p_i} \left\{ E\left[\eta_M \log\left(1 + \frac{g_{M,M} P_{tx,M} N_{t,M}}{\bar{\sigma}_{M,i}^2 + g_{i,M} p_i |h_{i,M} w_i|^2}\right) + \right.\right.$$
$$\left.\left. \eta_i \log\left(1 + \frac{g_{i,i} p_i |h_{i,i} w_i|^2}{\sigma_i^2 + g_{M,i} P_{tx,M}}\right) \right]\right\}$$
[Equation 5]

If two transmit antennas are applied to a femto BS, $w_i$ and $p_i$ can be represented as Equation 6.

$$p_i = P_{tx,i} \text{ and } r_i \exp(j\theta) w_n + r_2 w_h$$
[Equation 6]

Here, $r_1$, $r_2$ and $\theta_a$ denote optimization parameters in the range of $r_1$, $r_2 > 0$ and $0 \leq \theta < 2\pi$ and $w_n$ and $w_h$ respectively denote the basis for the null space of $h_{i,M}$ and the basis for the column space $h^H_{i,i}$.

If $w_n = w_h$, $w_i$ and $P_{tx,i}$ spans of all solutions to the above optimization problem can be simply represented as $w_i = w_h$. If $w_n \neq w_h$, $\exp(j\phi) w_i$ of $C^2$ space of all solutions to the above optimization problem is represented as $w_i = w_h$ and the choice φ does not affect performance.

Accordingly, interference can be controlled by $r_2$ and the remaining parts can be maximized as the second part of the equation.

It is possible to found out $r_1$ and $\theta$ that maximize Expression 7 using $r_2$.

$$|h_{i,i}w_i|^2 \quad \text{[Expression 7]}$$

The above equations can be simplified using a maximum value of $\{x^T A x\}$ through Expressions 6 and 7.

That is, Equations 8 and 9 are obtained.

$$\chi^T B \chi = 1 - \beta,\ \chi^T C \chi = 1 \quad \text{[Equation 8]}$$

$$\chi = \begin{bmatrix} \cos\theta \\ \sin\theta \\ r_1 \end{bmatrix}, \quad \text{[Equation 9]}$$

$$A = \begin{bmatrix} 0 & 0 & wv\cos\theta_w \\ 0 & 0 & -wv\sin\theta_w \\ wv\cos\theta_w & -wv\sin\theta_w & w^2 \end{bmatrix},$$

$$B = \begin{bmatrix} 0 & 0 & \gamma\cos\theta_\gamma \\ 0 & 0 & \gamma\sin\theta_\gamma \\ \gamma\cos\theta_\gamma & \gamma\sin\theta_\gamma & 1 \end{bmatrix},$$

$$C = \begin{bmatrix} 1 & 0 & 0 \\ 0 & 1 & 0 \\ 0 & 0 & 0 \end{bmatrix}$$

$w = |h_{i,i}w_n|,\ \theta_w = \angle(h_{i,i}w_n),\ v = r_2 h_{i,i} w_h,$
$\gamma = r_2 |\hat{w}_n^H \hat{w}_h|,$
$\theta_r = \angle(\hat{w}_n^H \hat{w}_h),$
$\beta = r_2^2 w_h^H w_h$ If a Lagrange multiplier is used, Equation 8 can be represented as Equation 10.

$$J(\chi) = \chi^T D \chi \text{ where } D = A + \lambda_1 B + \lambda_2 C \quad \text{[Equation 10]}$$

To maximize the result of Equation 8 or Equation 10, D must be negative definite, and $\partial J(\chi)/\partial \chi = 0$ or x needs to be within the null space of D.

Using the above equations, $r_1$ and $\theta$ can be obtained. That is, results of Equation 11 can be acquired.

$$r_1 = \sqrt{\frac{(a+\lambda_1 b)^2 + (c+\lambda_1 d)^2}{(e+\lambda_1)^2}} \quad \text{[Equation 11]}$$

$$\cos\theta = -\frac{(a+\lambda_1 b)(e+\lambda_1)}{(a+\lambda_1 b)^2 + (c+\lambda_1 d)^2} r_1$$

and $$\sin\theta = -\frac{(c+\lambda_1 d)(e+\lambda_1)}{(a+\lambda_1 b)^2 + (c+\lambda_1 d)^2} r_1$$

-continued $a = wv\cos\theta_w,$
$b = \gamma\cos\theta_\gamma,$
$c = -wv\sin\theta_w,$
$d = \gamma\sin\theta_\gamma,$
$e = w^2,$ $$\lambda_1 = -w^2 - w\sqrt{\frac{v^4 w^2 \cos^2\theta_w \sin^2\theta_w - 2vw\gamma\cos\theta_w\cos\theta_\gamma + 2vw\gamma\sin\theta_w\sin\theta_\gamma + \gamma^2 w^2}{1 - \beta + \gamma^2}}$$

$w = |h_{i,i}w_n|,$
$\theta_w = \angle(h_{i,i}w_n),$
$v = r_2 h_{i,i} w_h,$
$\gamma = r_2 |\hat{w}_n^H \hat{w}_h|,$
$\theta_r = \angle(\hat{w}_n^H \hat{w}_h),$
$\beta = r_2^2 w_h^H w_h$ The maximum value can be calculated as represented by Equation 12.

$$\bar{R}_i = \max_{r_2}\left\{E\left[\eta_M \log\left(1 + \frac{g_{M,M} p_{tx,M} N_{t,M}}{\sigma_{M,i}^2 + g_{i,M} p_{tx,i} r_2^2 |h_{i,M} w_h|^2}\right) + \eta_i \log\left(1 + \frac{g_{i,i} p_{tx,i} |h_{i,i}(r_1 e^{j\theta} w_n + r_2 w_h)|^2}{\sigma_i^2 + g_{M,i} p_{tx,M}}\right)\right]\right\} \quad \text{[Equation 12]}$$

Equation 12 can be simplified as Equation 13.

$$\bar{R}_i \geq \max_{r_2}\left\{E\left[\eta_M \log\left(1 + \frac{g_{M,M} p_{tx,M} N_{t,M}}{\sigma_{M,i}^2 + g_{i,M} p_{tx,i} r_2^2 |h_{i,M} w_h|^2}\right) + \eta_i \log\left(1 + \frac{g_{i,i} p_{tx,i} |h_{i,i} w_h|^2}{\sigma_i^2 + g_{M,i} p_{tx,M}}\right)\right]\right\} \quad \text{[Equation 13]}$$

Accordingly, the element for system optimization corresponds to extreme points ($r_2 = 0$ or 1) or $r_2^*$ that satisfies a derivative by which the result of Equation 13 becomes 0.

When $0 < r_2^* < 1$, $r_2^*$ can be represented as Equation 14.

$$r_2^* = \sqrt{\frac{\left(\frac{\eta_M}{\eta_i}g - g - 2\sigma^2\right) \pm \sqrt{\left(\frac{\eta_M}{\eta_i}g - g - 2\sigma^2\right)^2 + 4\left(\frac{\eta_M}{\eta_i}\frac{g}{s} - \sigma^2 g - \sigma^4\right)}}{2}} \quad \text{[Equation 14]}$$

$$g = \frac{g_{M,M} N_{t,M} P_{tx,M}}{g_{i,M} |h_{i,M}^{\hat{}} \hat{w}_h|^2 P_{tx,i}},\ \sigma^2 = \frac{\sigma_{M,i}^2}{g_{i,M} |h_{i,M}^{\hat{}} \hat{w}_h|^2 P_{tx,i}},\ s = \frac{g_{i,i} |h_{i,i}^{\hat{}} \hat{w}_h|^2 P_{tx,i}}{\sigma_i^2 + g_{M,i} P_{tx,M}}$$

That is, when the result of Equation 14 is applied, communication loss can be minimized to achieve efficient communication.

Furthermore, an interference temperature based system can be provided according to another embodiment of the present invention.

That is, $r_2$ can be set such that $|h_{i,M} w_i|^2 = k$ or equivalently. Here, $r_2$ can be represented as Equation 15.

$$r_2 = \sqrt{K/g_{i,M} \left|\hat{h}_{i,M} R(\hat{h}_{i,i}^H)\right|^2} \in [0, 1] \quad \text{[Equation 15]}$$

Accordingly, the best performance point can be detected by applying a different k value using offline optimization such as a field test.

According to another embodiment of the present invention, a convexificaiton method which is called soft interference nulling is applicable.

Here, first-order Taylor series expansion can be applied, which can be represented as Equations 16 and 17.

$$\bar{R}_i = \max_{Q_i} \left\{ E\left[ \eta_M \log\left(1 + \frac{\alpha}{\bar{\sigma}_{M,i}^2 + g_{i,M} h_{i,M} Q_i h_{i,M}^H}\right) + \eta_i \log\left(1 + \frac{g_{i,i} h_{i,i} Q_i h_{i,i}^H}{\beta}\right) \right] \right\} \quad \text{[Equation 16]}$$

$$\text{s.t. } \|Q_i\|_F^2 \leq P_{tx,i},$$
$$\alpha = g_{M,M} N_{t,M} P_{tx,M},$$
$$\beta = \bar{\sigma}_i^2 + g_{M,i} P_{tx,M}$$

$$\bar{R}_i \approx \max_{Q_i} \left\{ \begin{array}{c} \eta_M \log(\bar{\sigma}_{M,i}^2 + g_{i,M} h_{i,M} Q_i h_{i,M}^H + \alpha) + \\ \eta_i \log(\beta + g_{i,i} h_{i,i} Q_i h_{i,i}^H) - \eta_M \log\left(1 + \frac{g_{i,M}}{\bar{\sigma}_{M,i}^2} h_{i,M} Q_i h_{i,M}^H\right) - \eta_i \log \beta - \eta_M \log \bar{\sigma}_{M,i}^2 \end{array} \right\}$$

$$\text{s.t.} \|Q_i\|_F^2 \leq P_{tx,i},$$
$$\alpha = g_{M,M} N_{t,M} P_{tx,M},$$
$$\beta = \bar{\sigma}_i^2 + g_{M,i} P_{tx,M}$$

$$\bar{R}_i \geq \max_{Q_i} \left\{ E\left[ \eta_M \log\left(1 + \frac{\alpha}{\bar{\sigma}_{M,i}^2 + g_{i,M} h_{i,M} Q_i h_{i,M}^H}\right) + \eta_i \log\left(1 + \frac{g_{i,i} h_{i,i} Q_i h_{i,i}^H}{\beta}\right) \right] \right\} \quad \text{[Equation 17]}$$

$$\text{s.t.} \|Q_i\|_F^2 \leq P_{tx,i},$$
$$\alpha = g_{M,M} N_{t,M} P_{tx,M},$$
$$\beta = \bar{\sigma}_i^2 + g_{M,i} P_{tx,M}$$

$$\bar{R}_i \geq \max_{Q_i} \left\{ \begin{array}{c} \eta_M \log(\bar{\sigma}_{M,i}^2 + g_{i,M} h_{i,M} Q_i h_{i,M}^H + \alpha) + \\ -\eta_M Tr\left(t_i^{-1} \cdot \frac{g_{i,M}}{\bar{\sigma}_{M,i}^2} \cdot h_{i,M} Q_i h_{i,M}^H\right) + \eta_M Tr\left(t_i^{-1} \cdot \frac{g_{i,M}}{\bar{\sigma}_{M,i}^2} \cdot h_{i,M} Q_i h_{i,M}^H\right) - \eta_i \log \beta - \eta_M \log \bar{\sigma}_{M,i}^2 \end{array} \right\}$$

$$\text{s.t.} \|Q_i\|_F^2 \leq P_{tx,i},$$
$$\alpha = g_{M,M} N_{t,M} P_{tx,M},$$
$$\beta = \bar{\sigma}_i^2 + g_{M,i} P_{tx,M},$$
$$t_i = 1 + \frac{g_{i,M}}{\bar{\sigma}_{M,i}^2} \cdot h_{i,M} Q_i h_{i,M}^H$$

Here, $\log \det(I+X) \approx \log \det(I+X_0) + Tr((I+X_0)^{-1}(X-X_0))$ can be used and $Q_i$ can be optimized. That is, this can be represented as Table 1.

TABLE 1

Initialize
Loop
  Compute $Q_i^*$
  If $C_M^* - C_M^* < \epsilon$
  » Break;
  Else
  »

TABLE 1-continued

End
End

Simulation results according to the present invention are illustrated in FIGS. 21 to 27.

Simulations of FIGS. 21 to 27 are based on the assumption of Table 2.

TABLE 2

Number of Femto cells (N): 100
Number of transmit antenna at Macro cell ($N_{t,M}$): [1, 2, 4]
Number of transmit antenna at Femto cell ($N_t$): [1, 2]
Number of receive antenna at MS: 1
$P_{tx,M}$ = 43 dBm
$P_{tx}$ = 23 dBm
Noise Figure: 7 dB
Thermal noise: −174 dBm/Hz
Number of subcarriers: 1024
Subcarrier Spacing: 10 kHz
Other cell interference: set as cell edge Macro MS's TABLE 2-continued SNR is −3 dB when there is no femto interference
A wall penetration loss: 5 dB
Radios of Macro cell: 200 m
Radios of Femto cell: 15 m
Network Entry Policy: Closed Subscriber Group (CSG)

Figure 21:
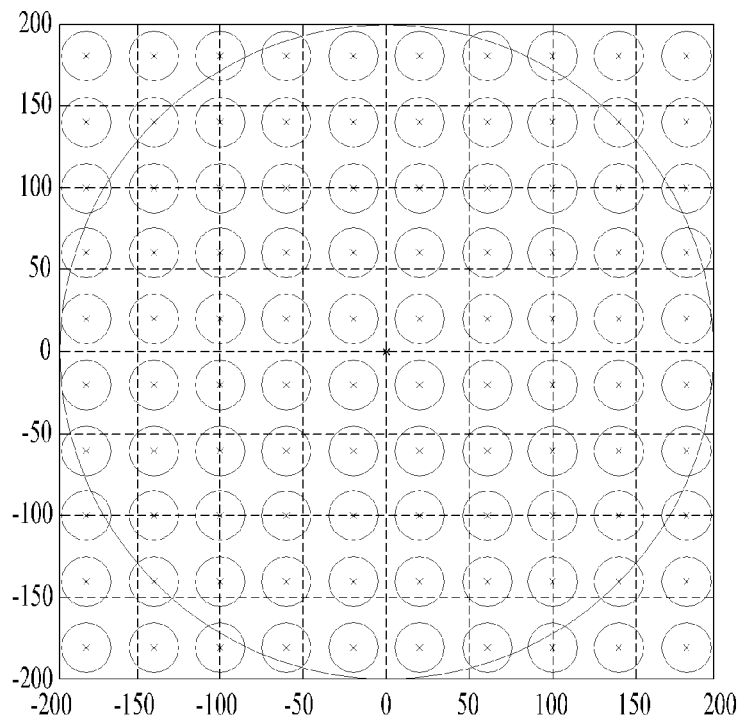
FIG. 21 illustrates a network layout to which the present invention is applicable.

FIG. 21 illustrates a network layout to which the present invention is applied.

Figure 22:
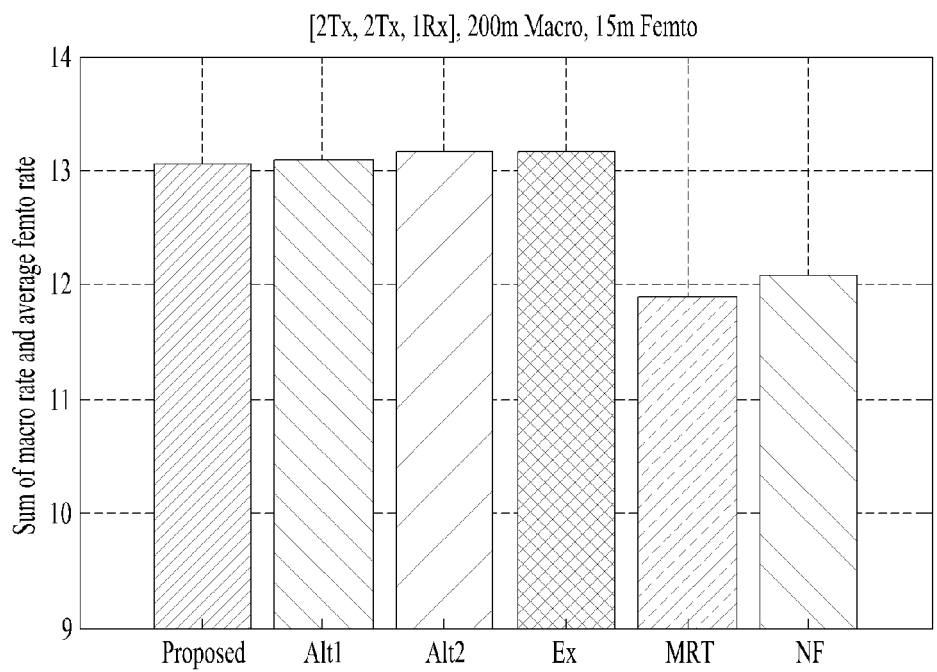
FIG. 22 illustrates result values of the present invention in a CSG case to which 2Tx, 2Tx and 1Rx are applied.

FIG. 22 illustrates result values of the present invention in a CSG case to which 2Tx, 2Tx and 1Rx are applied.

FIGS. 23(a) and 23(b) illustrate result values of the present invention in a CSG case to which 2Tx, 2Tx and 1Rx are applied.

Figure 24:
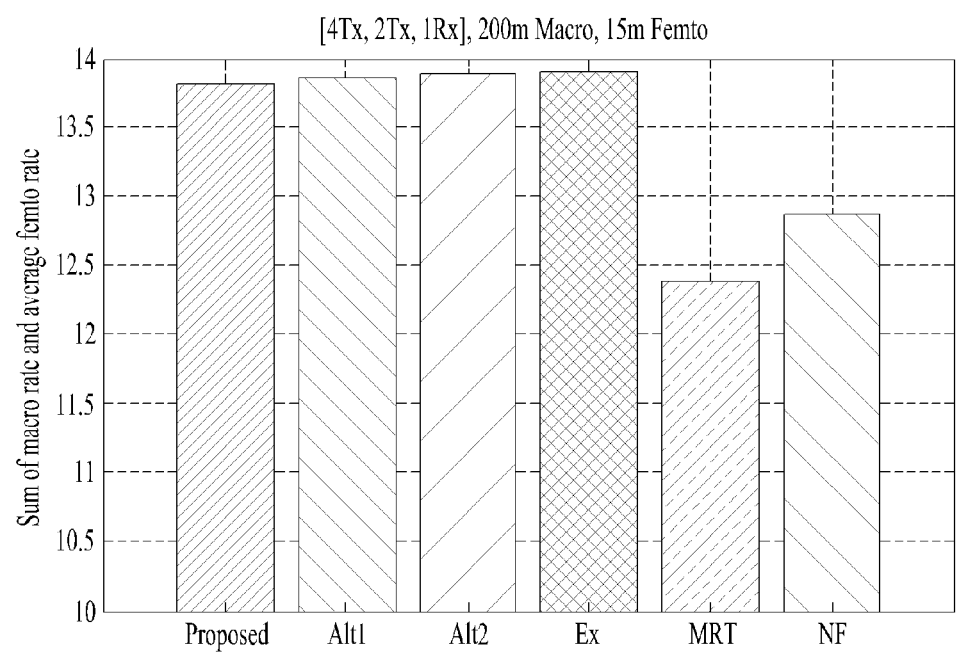
FIG. 24 illustrates result values of the present invention in a CSG case to which 4Tx, 2Tx and 1Rx are applied.
Figure 26:
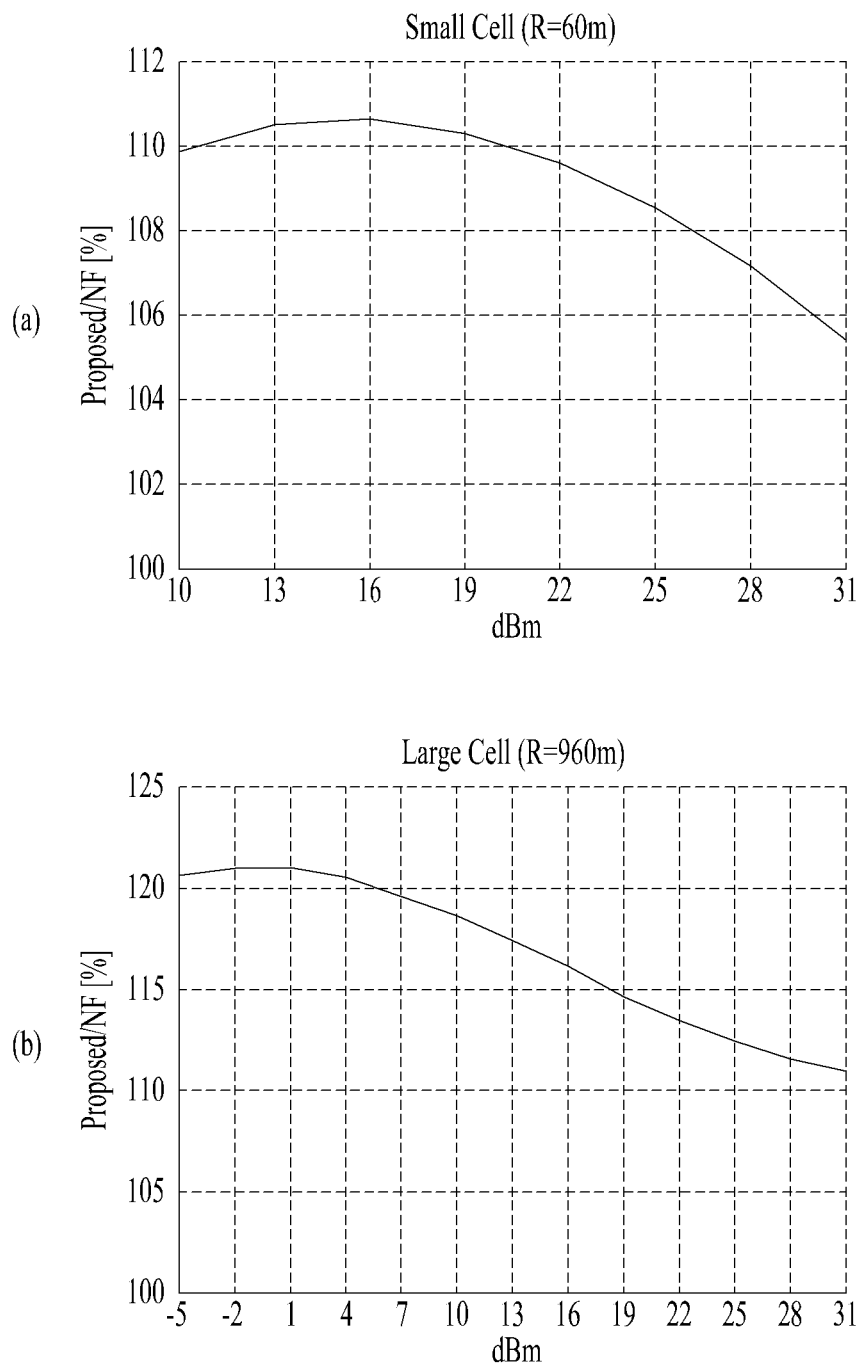
FIGS. 26(a) and 26(b) illustrate impact of femto BS power.

FIG. 24 illustrates result values of the present invention in a CSG case to which 4Tx, 2Tx and 1Rx are applied.

FIGS. 25(a) and 25(b) illustrate result values of the present invention in a CSG case to which 4Tx, 2Tx and 1Rx are applied.

FIGS. 26(a) and 26(b) illustrate impacts of femto BS power.

FIGS. 27(a) and 27(b) illustrate impacts of the number of femto BSs.

Referring to FIGS. 22 to 27, it can be confirmed that the method proposed by the present invention produces results similar to those of alternatives.

In addition, when the proposed method is applied, better performance can be achieved compared to two extreme cases to which null forming or maximal rate transmission is applied.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

In the embodiments of the present invention, a description has been given, centering on a data transmission and reception relationship between a BS and a UE. A specific operation described as performed by the BS may be performed by an upper node of the BS. That is, it is apparent that, in a network composed of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'Mobile Station (MS)', 'Mobile Subscriber Station (MSS)', 'Subscriber Station (SS)', etc.

The embodiments of the present invention may be achieved by various means, for example, hardware, firmware, software, or a combination thereof. In a hardware configuration, the methods according to the embodiments of the present invention may be achieved by one or more ASICs (application specific integrated circuits), DSPs (digital signal processors), DSPDs (digital signal processing devices), PLDs (programmable logic devices), FPGSs (field programmable gate arrays), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method for transmitting control information in a wireless communication system and a device for the same have been described focusing on examples applied to 3GPP LTE, the method and device can be applied to various wireless communication systems in addition to 3GPP LTE.

The invention claimed is:

1. A method for allocating resources by a femtocell base station (BS) to a first terminal connected thereto, the method comprising:

receiving, by the femtocell BS, first information about a user detection signal (UDS) resource region where a second terminal being connected to a macrocell BS is configured to transmit a UDS;

calculating, by the femtocell BS, a distance between the second terminal and the femtocell BS using the first information; and if the calculated distance is equal to or greater than a predetermined threshold distance, transmitting, by the femtocell BS to the first terminal, second information for allocating resources to the first terminal, wherein the second information is determined based on the first information, and if the calculated distance is shorter than the predetermined threshold distance, transmitting third information to the first terminal, wherein the third information is about null forming through which the first terminal performs transmission with low power towards where the second terminal is located.

2. The method according to claim 1, wherein the first information is used for allocation of resources to the first terminal.

3. The method according to claim 2, wherein if a received signal strength of the UDS is lower than a predetermined strength, the calculated distance between the second terminal and the femtocell BS is determined to be equal to or greater than the predetermined threshold distance.

4. The method according to claim 1, wherein the first information is transmitted in each frame or each superframe corresponding to a set of a plurality of frames.

5. The method according to claim 1, further comprising:
calculating a distance between the second terminal and the femtocell BS using long term statistics for the first information.

6. The method according to claim 5, wherein the long term statistics include average sense and long term fading.

7. A method through which a first terminal connected to a femtocell base station (BS) is allocated resources from the femtocell BS, the method comprising:

receiving, by the first terminal, first information about a user detection signal (UDS) resource region where a second terminal being connected to a macrocell BS is configured to transmit a UDS;

calculating, by the first terminal, a distance between the second terminal and the first terminal using the first information; and if the calculated distance is equal to or greater than a predetermined threshold distance, receiving, by the first terminal from the femtocell BS, second information for allocating resources to the first terminal, wherein the second information is determined based on the first information, and if the calculated distance is shorter than the predetermined threshold distance, receiving third information from the femtocell BS, wherein the third information is about null forming through which the first terminal performs transmission with low power towards where the second terminal is located.

8. The method according to claim 7, wherein the first information is used for allocation of resources to the first terminal.

9. The method according to claim 8, wherein if a received signal strength of the UDS is lower than a predetermined strength, the calculated distance between the second terminal and the first terminal is determined to be equal to or greater than the predetermined threshold distance.

10. The method according to claim 7, wherein the first information is transmitted in each frame or each superframe corresponding to a set of a plurality of frames.

11. The method according to claim 7, further comprising:
calculating a distance between the second terminal and the first terminal using long term statistics for the first information.

12. The method according to claim 11, wherein the long term statistics include average sense and long term fading.

13. A femtocell base station (BS) for allocating resources to a first terminal, the femtocell BS comprising:
a reception module configured to receive first information about a user detection signal (UDS) resource region where a second terminal being connected to a macro-cell BS is configured to transmit a UDS;
a processor configured to calculate a distance between the second terminal and the femtocell BS using the first information; and
a transmission module configured to transmit, to the first terminal, second information for allocating resources to the first terminal, if the calculated distance is equal to or greater than a predetermined threshold distance, and configured to transmit third information to the first terminal if the calculated distance is shorter than the predetermined threshold distance, and
wherein the third information is about null forming through which the first terminal performs transmission with low power towards where the second terminal is located.

14. The femtocell BS according to claim 13, wherein the processor is further configured to calculate a distance between the second terminal and the femtocell BS using long term statistics for the first information.

* * * * *